(12) United States Patent
Kim

(10) Patent No.: US 9,530,399 B2
(45) Date of Patent: Dec. 27, 2016

(54) ELECTRONIC DEVICE FOR PROVIDING INFORMATION TO USER

(71) Applicant: Samsung Electronics Co., Ltd., Suwon-si, Gyeonggi-do (KR)

(72) Inventor: Myoungwoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 14/264,679

(22) Filed: Apr. 29, 2014

(65) Prior Publication Data

US 2014/0337033 A1    Nov. 13, 2014

(30) Foreign Application Priority Data

May 9, 2013 (KR) ........................ 10-2013-0052691

(51) Int. Cl.
| | |
|---|---|
| G10L 13/08 | (2013.01) |
| G10L 13/00 | (2006.01) |
| A61H 3/06 | (2006.01) |
| G06F 3/0488 | (2013.01) |
| G06F 3/01 | (2006.01) |
| G09B 21/00 | (2006.01) |
| G06F 3/041 | (2006.01) |
| G06F 3/16 | (2006.01) |

(52) U.S. Cl.
CPC ............... G10L 13/00 (2013.01); A61H 3/06 (2013.01); A61H 3/061 (2013.01); G06F 3/016 (2013.01); G06F 3/0412 (2013.01); G06F 3/0488 (2013.01); G09B 21/007 (2013.01); *A61H 2003/063* (2013.01); *A61H 2201/5046* (2013.01); *A61H 2201/5048* (2013.01); *A61H 2201/5097* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 7,889,101 | B2* | 2/2011 | Yokota | ..................... 340/995.19 |
| 8,548,737 | B2* | 10/2013 | Kobayashi | ......... G01C 21/3629 |
| | | | | 701/428 |
| 8,560,224 | B2* | 10/2013 | Vu et al. | ........................ 701/410 |
| 8,700,316 | B2* | 4/2014 | Su | ....................... G01C 21/3415 |
| | | | | 701/300 |
| 8,706,415 | B2* | 4/2014 | Su et al. | ....................... 701/533 |
| 9,163,951 | B2* | 10/2015 | Su | ....................... G01C 21/3415 |
| 2007/0035527 | A1 | 2/2007 | Cheon et al. | |

(Continued)

FOREIGN PATENT DOCUMENTS

| | | |
|---|---|---|
| KR | 10-0710362 B1 | 4/2007 |
| WO | 03/096305 A1 | 11/2003 |
| WO | 2012/073015 A1 | 6/2012 |

*Primary Examiner* — Satwant Singh
(74) *Attorney, Agent, or Firm* — Jefferson IP Law, LLP

(57) ABSTRACT

The present disclosure relates to an electronic device and a method which may visually provide information to a user, and notify the user of the information through other senses (e.g., a tactile sense, a hearing sense, etc.). The method includes performing voice guidance of information displayed on the touch screen in a predetermined order, detecting a user's input through the touch screen, and changing the order and performing the voice guidance in the changed order, when the detected user's input is a direction change input.

18 Claims, 18 Drawing Sheets

(56) References Cited

U.S. PATENT DOCUMENTS

| | | | |
|---|---|---|---|
| 2007/0124027 A1* | 5/2007 | Betzitza et al. | 701/1 |
| 2008/0059055 A1* | 3/2008 | Geelen et al. | 701/201 |
| 2009/0102805 A1 | 4/2009 | Meijer et al. | |
| 2010/0030459 A1* | 2/2010 | Geelen et al. | 701/200 |
| 2013/0027320 A1* | 1/2013 | Chang et al. | 345/173 |
| 2014/0372020 A1* | 12/2014 | Stein | G01C 21/3602 701/410 |
| 2016/0167650 A1* | 6/2016 | Clarke | B60W 30/00 701/28 |

* cited by examiner

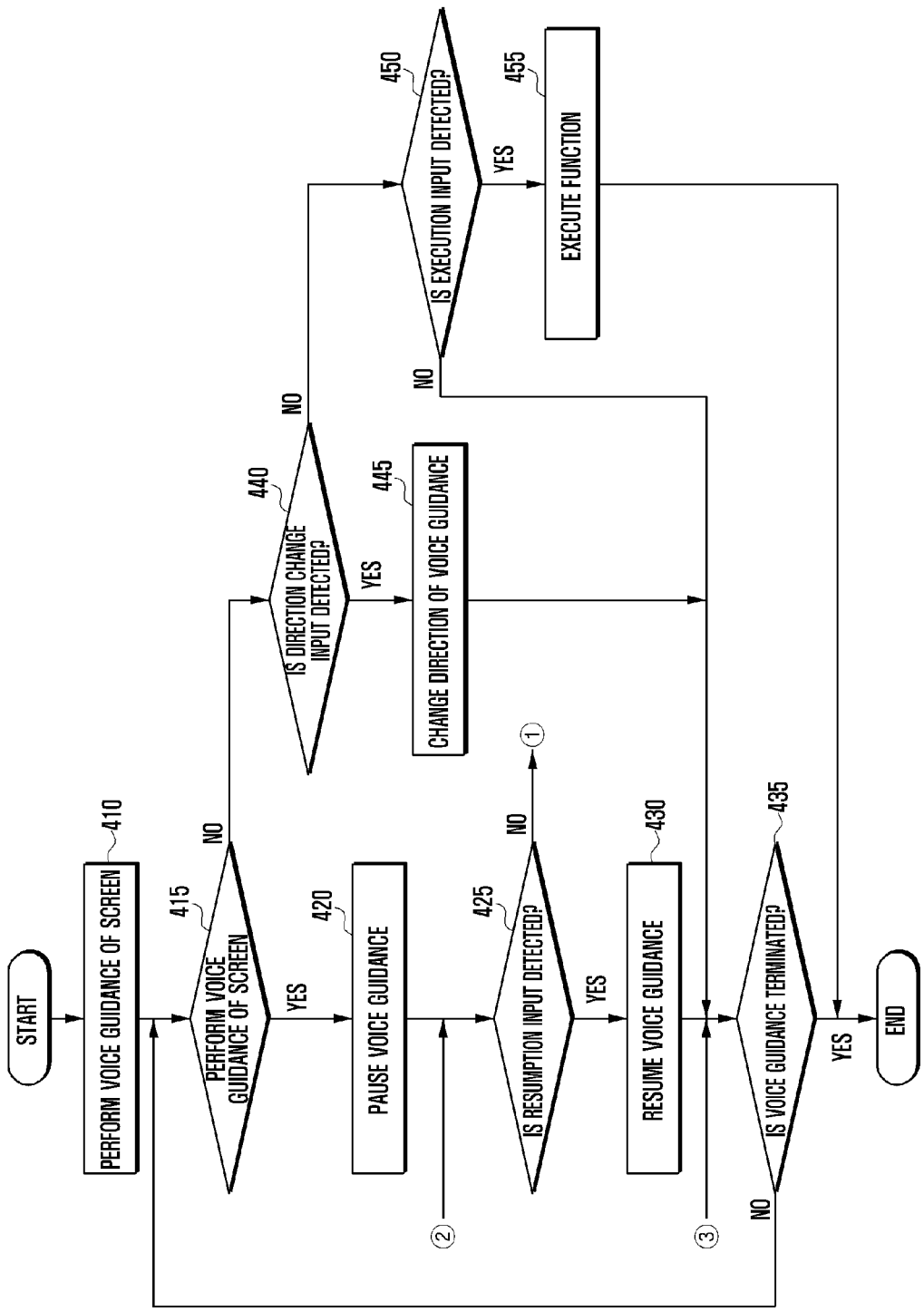

ELECTRONIC DEVICE FOR PROVIDING INFORMATION TO USER

CROSS-REFERENCE TO RELATED APPLICATION(S)

This application claims the benefit under 35 U.S.C. §119(a) of a Korean patent application filed on May 9, 2013 in the Korean Intellectual Property Office and assigned Ser. No. 10-2013-0052691, the entire disclosure of which is hereby incorporated by reference.

TECHNICAL FIELD

The present disclosure relates to an operation of an electronic device.

BACKGROUND

Electronic device are now provided with various user functions based on the development of hardware technology. Especially, electronic devices having a touch screen have been widely used. Such an electronic device may display information on the touch screen and may provide feedback to a user in response to a user's input (e.g. a touch on an icon displayed on the touch screen) for the displayed information. For example, the electronic device may execute an application corresponding to the touched icon and may display information relating to the executed application. However, although information is visually provided, a user may have difficulty in identifying the information (e.g. the user has poor sight, the user is driving, etc.). Accordingly, alternatives for these cases are needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for improving accessibility and use efficiency for an electronic device by allowing a user to recognize information displayed on a screen through at least one of an acoustic feedback or a tactile feedback.

In accordance with an aspect of the present disclosure, a method of operating an electronic device having a touch screen is provided. The method includes performing voice guidance of information displayed on the touch screen in a predetermined order, detecting a user's input through the touch screen, and, when the detected user's input is a direction change input, changing the order and performing the voice guidance in the changed order.

In accordance with another aspect of the present disclosure, an electronic device is provided. The electronic device includes a touch screen, a memory configured to store information to be displayed on the touch screen, an audio processor and a speaker configured to perform voice guidance of information displayed on the touch screen, a screen reader configured to perform the voice guidance of the information displayed on the touch screen in a predetermined order, to detect a user's input through the touch screen, and when the detected user's input is a direction change input, to change the order and perform the voice guidance in the changed order, and at least one processor configured to execute the screen reader. Further, when the detected user's input is an amount change input, the screen reader of the electronic device may be further configured to change an amount of the voice guidance according to the amount change input. Further, the electronic device may further include vibration motors in order to allow a user to recognize a location of information being currently guided through a voice.

As described above, a method and an apparatus according to the present disclosure allow a user to recognize information displayed on a screen through at least one of an acoustic feedback or a tactile feedback, so as to improve accessibility and use efficiency for an electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B are flowcharts illustrating a method of performing voice guidance of a screen according to an embodiment of the present disclosure;

The same reference numerals are used to represent the same elements throughout the drawings.

DETAILED DESCRIPTION

Figure 1:
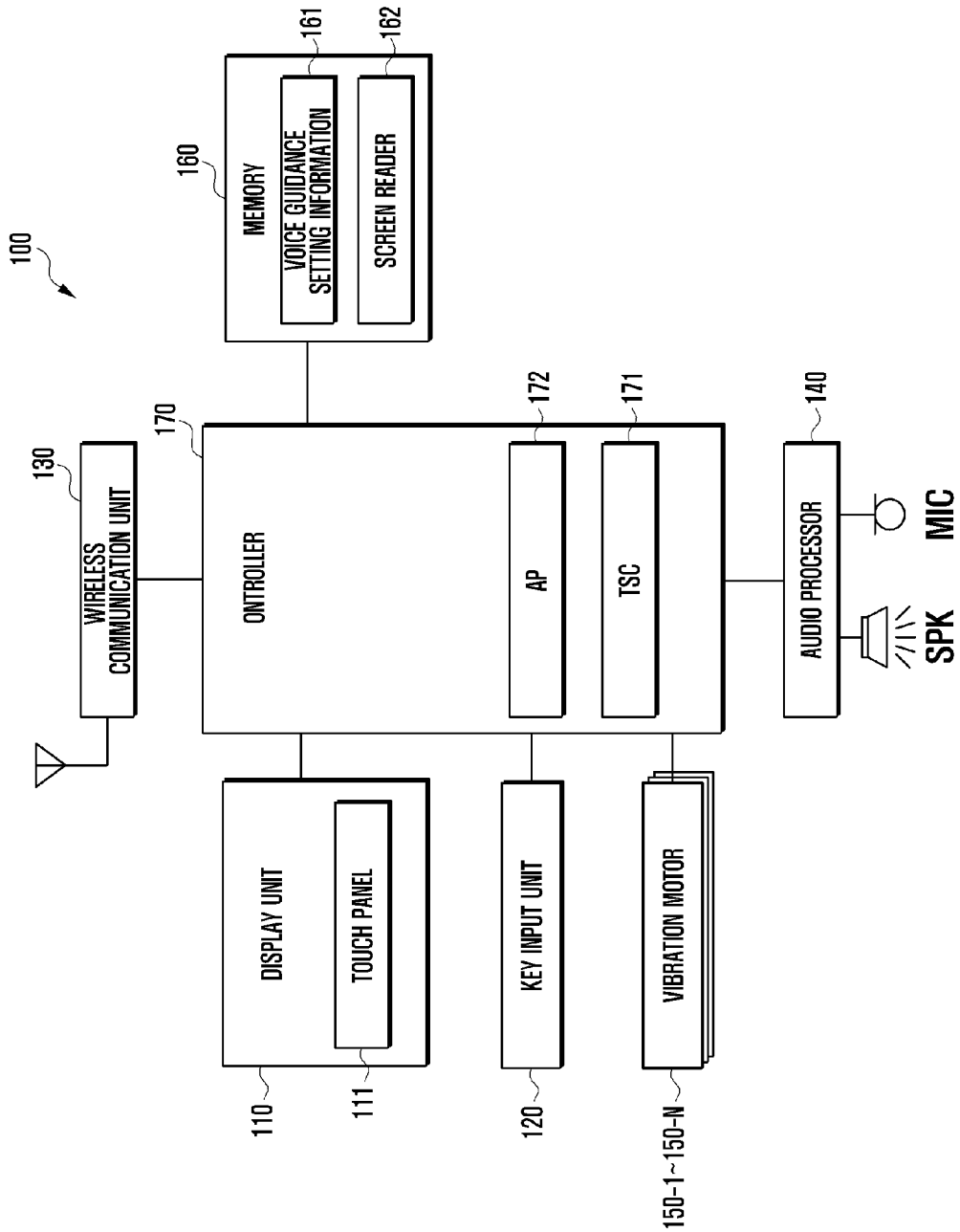
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When using an electronic device, it is difficult for a person having poor eye sight to recognize how a screen being displayed on the electronic device is configured. In addition, it is difficult for such a person to find a desired object or to execute a desired function and a desired application. For example, although it may be possible to find a desired object, a desired function, or a desired application in a limitative narrow screen, it is very difficult for a person having poor eye sight to find a desired object, a desired function, and a desired application, in a considerably wide screen.

One reason why such difficulty is generated is that means of a visual sense recognizing information of a screen is blocked. Thus, when the means of the visual sense is blocked, it is necessary to improve accessibility and use efficiency for an electronic device by transferring information of a screen to a user through alternative means (e.g. sound, vibration, etc.).

An electronic device according to the present disclosure may inform a user of screen information through sound or vibration, in response to a touch gesture of the user for a touch screen. Here, the touch gesture may be, for example, tapping, double tapping, sliding, pinching, spreading, etc.

An electronic device according to the present disclosure may sequentially guide a user from information located at an upper end of the screen to information located at a lower end of the screen through voice or vibration, in response to the touch gesture. Further, the electronic device may sequentially guide a user from information located at a lower end of the screen to information located at an upper end of the screen, through voice or vibration. Accordingly, the user may explore information in a front direction or in a rear direction. That is, the user may imagine locations of each of pieces of information in his/her brain without viewing the screen.

When the means of the visual sense is blocked, the user may identify a configuration of the screen through an acoustic sense or a tactile sense. For example, information may be configured by several views (namely, pages). When at least one of the views is initially displayed, voice data describing a configuration of the views to the user may be played back. Further, when the views are switched (for example, when displaying of a first view is terminated and a second view is displayed), voice data describing the newly-displayed second view may be played back. The user may find a region in which desired information (e.g. icons, images, texts, etc.) is included, through a first touch, and may imagine the found region in his/her brain by expressing information included in the corresponding region through voice or vibration. When the screen of the electronic device is narrow or a configuration of information displayed on the screen is simple (for example, only icons are displayed), a user may easily imagine the screen in his/her brain. However, when a configuration of displayed information is relatively complex (for example, various kinds of information such as icons, images, texts, etc. are displayed) or when the screen of the electronic device is relatively large so that a number of pieces of information are displayed, it is very difficult to imagine the screen in his/her brain. Thus, as the screen becomes larger, the accessibility and the use efficiency for the electronic device may deteriorate.

The electronic device according to the present disclosure may provide a function of pausing voice guidance, a function of changing a traveling direction of voice guidance, a function of changing a speed of voice guidance, a function of performing voice guidance based on the touched location, a function of changing an area of voice guidance, a function of changing an amount of voice guidance, a function of repeatedly performing voice guidance several times, a function of providing a location for information being informed of by voice, etc. The accessibility and the use efficiency for the electronic device may be improved by such functions.

The electronic device according to the present disclosure corresponds to a device having a touch screen, and may include, for example, a smart phone, a tablet Personal Computer (PC), a notebook PC, a digital camera, a smart TV, a Personal Digital Assistant (PDA), an electronic notepad, a desktop PC, a Portable Multimedia Player (PMP), a Media Player (e.g. a MP3 player), a sound equipment, a smart watch, a gaming terminal, etc. Further, the electronic device according to the present disclosure may include a home appliance (e.g. a refrigerator, a television, and a washing machine) having a touch screen.

Hereinafter, various embodiments of the present disclosure are described with reference to the accompanying drawings.

In describing the various embodiments, a description of technical contents, which are well known in the technical field to which the present disclosure pertains and are not directly related to the present disclosure, will be omitted. Further, a detailed description of components substantially having the same configuration and the same function will be omitted.

Likewise, some components in the accompanying drawings may be exaggeratively or schematically illustrated or omitted, and the size of each component does not completely reflect the actual size of each component. Thus, the present disclosure is not limited by the relative size or interval drawn in the accompanying drawings.

FIG. 1 is a block diagram illustrating an electronic device according an embodiment of the present disclosure.

Referring to FIG. 1, the electronic device 100 may include a display unit 110, a key input unit 120, a wireless communication unit 130, an audio processor 140, a Speaker (SPK), a Microphone (MIC), vibration motors 150_1 to 150_N, a memory 160, and a controller 170.

The display unit 110 may display various pieces of information on a screen under the control of the controller 170, especially, an Application Processor (AP). For example, when the controller 170 processes (for example, decodes) information and stores the processed information in a memory (e.g. a frame buffer), the display unit 110 may convert data stored in the frame buffer into an analog signal to be displayed on the screen. The display unit 110 may be formed by a Liquid Crystal Display (LCD), an Active Matrix Organic Light Emitted Diode (AMOLED), a flexible display, a transparent display, or the like.

When power is supplied to the display unit 110, the display unit 110 may display a locking image on the screen. When unlocking information (e.g. a password) is detected while the locking image is displayed, the controller 170 may unlock the screen. When the screen is unlocked, the display unit 110 may display, for example, a home image instead of the locking image under the control of the controller 170. The home image may include a background image (e.g. a picture set by a user) and icons displayed thereon. Here, the icons may indicate applications or contents (e.g. a picture file, a video file, a record file, a document, a message, etc.), respectively. When one of the icons, for example, an icon of a camera application is selected by a user, the controller 170 may execute the camera application.

A touch panel 111 is installed on the screen of the display unit 110. For example, the touch panel 111 may be realized by an add-on type in which the touch panel 111 is located on the screen of the display unit 110, or an on-cell type or an in-cell type in which the touch panel 111 is inserted into the display unit 110. Further, the touch panel 111 may generate an input signal (e.g. an approaching event, a hovering event, a touch event, etc.) in response to a touch gesture (e.g. touch, tap, drag, flick, etc.) of a pointing device (e.g. a finger, a pen, a stylus, etc.) for the screen of the display unit 110, i.e., the touch screen, and may convert the input signal from an analog type to a digital type to transfer the converted signal to the controller 170, especially, to a touch screen controller. When the pointing device approaches the touch screen, the touch panel 111 generates an approaching event in response to the approaching. The approaching event may include information indicating movement of the pointing device and a direction of the movement of the pointing device. When the pointing device performs hovering on the touch screen, the touch panel 111 generates a hovering event in response to the hovering and transfers the hovering event to, for example, the touch screen controller. Here, the hovering event may include raw data, for example, one or more coordinates x and y. When the pointing device touches the touch screen, the touch panel 111 generates a touch event in response to the touch. Here, the touch event may include raw data, for example, one or more coordinates x and y.

The touch panel 111 may be a composite touch panel including a hand touch panel detecting a hand gesture and a pen touch panel detecting a pen gesture. Here, the hand touch panel is realized by a capacitive scheme. Of course, the hand touch panel may be realized by a resistive scheme, an infrared scheme, or a surface acoustic wave scheme. Further, the hand touch panel generates an event not only by a hand gesture, but also by other objects (e.g. an object which is made of a conductive material and can change capacitance). The pen touch panel (namely, a digitizer sensor substrate) may be configured by an Electro-Magnetic Resonance (EMR) scheme. Accordingly, the pen touch panel may generate an event by a touch pen which is specially manufactured to form a magnetic field. The pen touch panel may generate a key event. For example, when a key installed in a pen is pressed, a magnetic field generated by a coil of the pen is changed. The pen touch panel may generate a key event in response to a change in a magnetic field and may transfer the generated key event to the controller 170, especially, the touch screen controller.

The key input unit 120 may include at least one touch key. Such a touch key implies all types of input means which can recognize a touch or approaching of a human body and an object.

For example, the touch key may include a capacitive touch key which recognizes an input by detecting approaching of a human body or an object which has conductivity. The touch key may generate an event in response to a user's touch and transfer the event to the controller 170. Further, the touch key may be installed to be adjacent to the screen (for example, a lower end of the screen). For example, the controller 170 may control the display unit 110 to display a menu at a lower end of the screen, in response to an event of a first touch key (a menu recalling key). For example, the controller 170 may control the display unit 110 to display a previous image, in response to an event of a second touch key (a return key).

Further, the key input unit 120 may include keys driven by other schemes in addition to the touch scheme. For example, the key input unit 120 may include at least one dome key. When a user presses the dome key, the dome key is deformed and then contacts a printed circuit board. Accordingly, a key event is generated in the printed circuit board and is transferred to the controller 170. Such a dome key may be installed at a lateral side of the electronic device 100 or adjacent to the screen (for example, at a lower end of the screen). Meanwhile, a key in the key input unit 120 refers to a hard key, and a key displayed on the display unit 110 refers to a soft key.

The wireless communication unit 130 may perform voice call, video call, or data communication with an external device via networks under the control of the controller 170. The wireless communication unit 130 may include a mobile communication module (e.g. a $3^{rd}$ generation mobile communication module, $3.5^{th}$ generation mobile communication module, or $4^{th}$ generation mobile communication module), a digital broadcasting module (e.g. a Digital Multimedia Broadcasting (DMB) module), a short-distance communication module (e.g. a Wi-Fi module, a Bluetooth module, and a Near Field Communication (NFC) module), and the like.

The audio processor 140 performs inputting and outputting of an audio signal (e.g. voice data) for voice recognition, voice recording, digital recording, and voice call in conjunction with the speaker and the microphone. The audio processor 140 receives an audio signal (e.g. voice data) from the controller 170, converts the received audio signal from a digital type into an analog type, amplifies the converted audio signal, and then outputs the amplified audio signal to the speaker. The speaker converts the audio signal received from the audio processor 140 into a sound wave and outputs the converted audio signal. The microphone converts a sound wave transferred from a person or other sound sources into an audio signal. The audio processor 140 converts the audio signal received from the microphone from an analog type into a digital type, and transfers the converted audio signal to the controller 170.

The vibration motors 150_1 to 150_N vibrate under the control of the controller 170. Especially, the vibration motors 150_1 to 150_N may regulate the intensity of a vibration under the control of the controller 170.

The memory 160 may store data which is generated according to operations of the electronic device 100 or is received from the outside through the wireless communication unit 130, under the control of the controller 170. The memory 160 may include a buffer as a temporary data storage space.

The memory 160 may store various pieces of setting information for setting a use environment of the electronic device 100. Accordingly, the controller 170 may operate the electronic device 100 with reference to the setting information. For example, the memory 160 may store voice guidance setting information 161.

The voice guidance setting information 161 may include a setting value indicating whether voice guidance is executed or not. When the setting value is "ON", a screen reader 162 for voice guidance, displayed on the screen, may be executed. When the setting value is "OFF", the screen reader 162 may be terminated. Such a setting value may be set by a user.

When the screen reader 162 is executed, a user's input, to which the electronic device 100 responds, may be changed. If so, the voice guidance setting information 161 may store a setting table which defines functions executed in response to a user's input. For example, the setting table may be Table 1 as follows.

TABLE 1

| | Setting value = "ON" | Setting value = "OFF" |
| --- | --- | --- |
| Select items | Tap | Tap |
| Activate selected items | Double tap | |
| Screen scroll | Drag with two fingers | Drag |

For example, in a case where a first web page is displayed on the screen and a user taps an image included in the first web page, when the setting value is "OFF", the controller 170 may control the wireless communication unit 130 to download a second web page linked to the image, in response to the tap manipulation. Further, the controller 170 may control the display unit 110 to display the second web page. When a user drags the second web page with one finger, the controller 170 may control the display unit 110 to display other portions of the second web page, in response to the drag manipulation.

When the setting value is "ON", the controller 170 may control the audio processor 140 to reproduce voice data describing that the image is selected, in response to the tap manipulation. Further, the controller 170 may control the display unit 110 to display the image emphatically (for example, to display an outline of the image thickly). When a user double-taps the selected image, the controller 170 may control the wireless communication unit 130 to download the second web page linked to the image, in response to the double-tap manipulation. Further, the controller 170 may control the display unit 110 to display the second web page and may control the audio processor 140 to reproduce voice data for describing the second web page. When a user drags the second web page with two fingers, the controller 170 may control the display unit 110 to display other portions of the second web page, in response to the drag manipulation.

The voice guidance setting information 161 may include the number of times of the voice guidance. The controller 170 may control the audio processor 140 to reproduce "voice data for describing information displayed on the screen". For example, voice data for describing where the information is located in the screen and what contents of the information may be played back through the speaker. When the voice guidance of the information displayed on the screen is completed, the controller 170 restarts the voice guidance from the beginning based on the preset number of times of voice guidance.

Meanwhile, the number of times of the voice guidance may be differently set according to whether the information displayed on the screen is new or not. For example, when the displayed information has been previously viewed by a user, the voice guidance may be performed once. When the displayed information is new, the voice guidance may be performed two times. For example, it may be assumed that a home page is configured by various pages. When each of the pages is first displayed, the voice guidance may be performed two times. Further, when each of the pages is subsequently displayed, the voice guidance may be performed once. Here, a reference time point of "first" may be a time point of executing the screen reader 162, a time point of unlocking the screen, a time point executing an application corresponding to the information displayed on the screen, or the like.

The number of times of the voice guidance may be differently set according to the types of information. For example, voice guidance of a home image is performed once, and in a case of a web page, which is more complex to imagine in a user's brain than the home image, voice guidance of the web page may be configured to be performed more than two times.

The voice guidance setting information 161 may include level information indicating an amount of the voice guidance. The controller 170 may control the audio processor 140 to reproduce "voice data for describing information displayed on the screen in detail". The controller 170 may control the audio processor 140 to reproduce "voice data for describing information displayed on the screen briefly". For example, when the level information is set as "high", a title of the information and a detailed content of the information may be guided through a voice. Further, voice data describing where the information is located on the screen may be played back. Meanwhile, the level information is set as "low", only a title of the information may be guided through a voice.

Meanwhile, an amount of the voice guidance may be differently set according to whether the information displayed on the screen is new or not. For example, when the displayed information has been previously viewed by a user, only a title of the information may be played back through voice. When the displayed information is new, voice data describing a title, a detailed content and location information may be played back.

An amount of the voice guidance may be differently set according to the types of information. For example, voice guidance of a home image is performed briefly, and in a case of a web page, which is more complex to imagine in a user's brain than the home image, voice guidance of the web page may be set to be performed in detail.

The voice guidance setting information 161 may include speed information of the voice guidance. The controller 170 may control the audio processor 140 to reproduce voice data for describing information displayed on the screen rapidly or relatively slowly. For example, when the speed information is set as "1×", voice data may be played back in 1× speed. As another example, when the speed information is set as "2×", voice data may be played back in 2× speed.

The playback speed of the voice guidance may be differently set according to whether the information displayed on the screen is new or not. For example, when the displayed information has been previously viewed by a user, the voice data may be played back in 2× speed. When the displayed information is new, the voice data may be played back in 1× speed. The playback speed of the voice guidance may be differently set according to the types of information. For example, voice data for describing a home image may be played back in 2× speed, and voice data for describing a web page may be played back in 0.5× speed.

The voice guidance setting information 161 may include progress direction information of the voice guidance. The controller 170 may control the audio processor 140 to determine a progress direction of the voice guidance with reference to the progress direction information and to first start voice guidance of information corresponding to the determined progress direction. For example, when the progress direction information is set as "left to right and top to bottom", voice guidance is sequentially performed with respect to information located a left-upper side to information located a right-lower side.

As described above, the voice guidance setting information 161 may include the setting value indicating whether the voice guidance is executed, the number of times of the voice guidance, the level information indicating an amount of the voice guidance, the speed information of the voice guidance and the progress direction information of the voice guidance. The controller 161 may perform the voice guidance of the information displayed on the screen based on the set information. Of course, the controller 161 may perform the voice guidance of the information regardless of the set information. For example, the controller 161 may perform the voice guidance in response to a user's input (e.g. a touch gesture).

The memory 160 may store various programs, e.g. a booting program, one or more operating systems and one or more applications, for operating the electronic device 100. Especially, the memory 160 may store the information displayed on the screen in the screen reader 162 for the voice guidance.

The screen reader 162 may be a program configured to perform the voice guidance of the information displayed on the screen in a predetermined sequence. In order to perform such voice guidance, the screen reader 162 may be configured to perform a Text-To-Speech (TTS) operation which converts the displayed information into voice data and an operation which reproduces the converted voice data.

Further, the screen reader 162 may be configured to perform an operation which recognizes a location on the screen of the information and an operation which generates voice data for describing the recognized location and reproduces the voice data.

Further, the screen reader 162 may be configured to perform an operation of temporarily stopping the voice guidance in response to a user's input (e.g. a touch gesture), an operation of changing the progress direction of the voice guidance in response to a user's input (i.e. changing the sequence), an operation of changing the speed of the voice guidance in response to a user's input, an operation of performing the voice guidance based on a touched location, an operation of changing an area of the voice guidance, an operation of changing an amount of the voice guidance and an operation of repeatedly performing the voice guidance.

The memory 160 may include a main memory and a secondary memory. The main memory may be realized by, for example, a Random Access Memory (RAM). The secondary memory may be realized by a disk, a RAM, a Read-Only Memory (ROM), a flash memory, etc. The main memory unit may store various programs, e.g. a booting program, an operating system, and an application, loaded from the secondary memory. When electric power of a battery is supplied to the controller 170, the booting program is loaded to the main memory. Such a booting program loads the operating system to the main memory unit. The operating system loads an application (e.g. the screen reader 162) to the main memory. The controller 170 (e.g. an AP) accesses the main memory to decode a command (routine) of the program, and executes functions (e.g. the voice guidance, etc.) according to the decoded result. That is, various programs are loaded to the main memory and are operated as processes.

The controller 170 controls an overall operation of the electronic device 100 and a signal flow between components within the electronic device, performs a function of processing data, and controls power supply from the battery to the components. The controller 170 may include a touch screen controller 171 and an AP 172.

When receiving an event from the touch panel 111, the touch screen controller 171 may determine touch coordinates and transfer the touch coordinates to the AP 172. When receiving a hovering event from the touch panel 111, the touch screen controller 171 recognizes generation of the hovering. The touch screen controller 171 may determine a hovering area on a touch screen in response to the hovering and may determine hovering coordinates x and y on the hovering area. The touch screen controller 171 may transfer the determined hovering coordinates to, for example, the AP 172. Here, a unit of the hovering coordinates may be a pixel. For example, when a resolution of a screen is 640 (the number of horizontal pixels)*480 (the number of vertical pixels), coordinates of X axis are (0, 640), and coordinates of Y axis are (0, 480). When receiving the hovering coordinates from the touch screen controller 171, the AP 172 may determine that hovering of a pointing device is performed on the touch screen. On the other hand, when not receiving the hovering coordinates from the touch panel 111, the AP 172 may determine that the hovering of the pointing device is released from the touch screen. Further, when the hovering coordinates are changed and an amount of the change is larger than a movement threshold, the AP 172 determines that movement of the pointing device is generated. The AP 172 may determine an amount dx and dy of a change in a location of the pointing device and a movement speed of the pointing device, in response to the movement of the pointing device. The AP 172 may determine a user's input for the touch screen as any one of a drag, a flick, a pinch-in, a pinch-out, a boundary-in and a boundary-out, based on the hovering coordinates, whether the hovering of the point device is released, whether the pointing device is moved, the amount of the change in the location of the pointing device, the movement speed of the pointing device, and the like. Here, the boundary-in may be, for example, a gesture by which the pointing device moves from a boundary (e.g. a bezel) of the touch screen into the touch screen. The boundary-out may be a gesture by which the pointing device moves from the touch screen to the boundary of the touch screen. Further, the hovering event may include detection information for determining a depth. For example, the hovering event may include 3-dimentional coordinates x, y and z. Here, a value of z may imply the depth.

When receiving a touch event from the touch panel 111, the touch screen controller 171 may recognize generation of the touch. The touch screen controller 171 may determine a touch area on the touch screen in response to the touch and may determine touch coordinates x and y on the touch area. The touch screen controller 171 may transfer the determined touch coordinates to, for example, the AP 172. Here, a unit of the touch coordinates may be a pixel. When receiving the touch coordinates from the touch screen controller 171, the AP 172 determines that a touch of the pointing device is performed on the touch panel 111, and when not receiving the touch coordinates from the touch panel 111, the AP 172 determines that the touch of the pointing device is released from the touch screen. Further, when the touch coordinates are changed and an amount of the change is larger than a movement threshold, the AP 172 determines that movement of the pointing device is generated. The AP 172 may determine an amount dx and dy of a change in a location of the pointing device and a movement speed of the pointing device, in response to the movement of the pointing device. The AP 172 may determine a user's input for the touch screen as any one of a touch, a multi-touch, a tap, a double tap, a long tap, a tap and touch, a drag, a flick, a press, a pinch-in, a pinch-out, a boundary-in, a boundary-out, etc., based on the touch coordinates, whether the touch of the pointing device is released, whether the pointing device is moved, the amount of the change in the location of the pointing device, the movement speed of the pointing device, etc.

The AP 172 may execute various programs stored in the memory 160. Especially, the AP 172 may execute the screen reader 162 by using the voice guidance setting information 161. Further, the AP 172 may execute the screen reader 162 in response to a user's input (e.g. a touch gesture). Of course, the screen reader 162 may be also executed by processors, e.g., a Central Processing Unit (CPU), other than the AP 172.

The controller 170 may further include various processors other than the AP. For example, the controller 170 may also include one or more CPUs. Further, the controller 170 may also include a Graphic Processing Unit (GPU) and a Communication Processor (CP) in a case where the electronic device 100 is provided with a mobile communication module (e.g. a $3^{rd}$ generation mobile communication module, a $3.5^{th}$ generation mobile communication module, a $4^{th}$ generation mobile communication module, etc.). Further, the controller 170 may also include an Image Signal Processor (ISP) in a case where the electronic device 100 is provided with a camera. In the aforementioned processors, two or more independent cores (e.g. a quad-core) may be integrated into one package formed by a singular integrated circuit. For example, the AP 172 may be a multi-core processor into which multiple cores are integrated. The aforementioned processors (e.g. the application processor and the ISP) may be a System-on-Chip (SoC) processor. Further, the aforementioned processors (e.g. the application processor and the ISP) may be a processor packaged in multiple layers.

Although not discussed in detail, the electronic device 100 may further include additional components such as a speaker, a microphone, an ear-jack, a camera, an acceleration sensor, a proximity sensor, an illumination sensor, a Global Positioning Sensor (GPS) reception module, etc.

Figure 2:
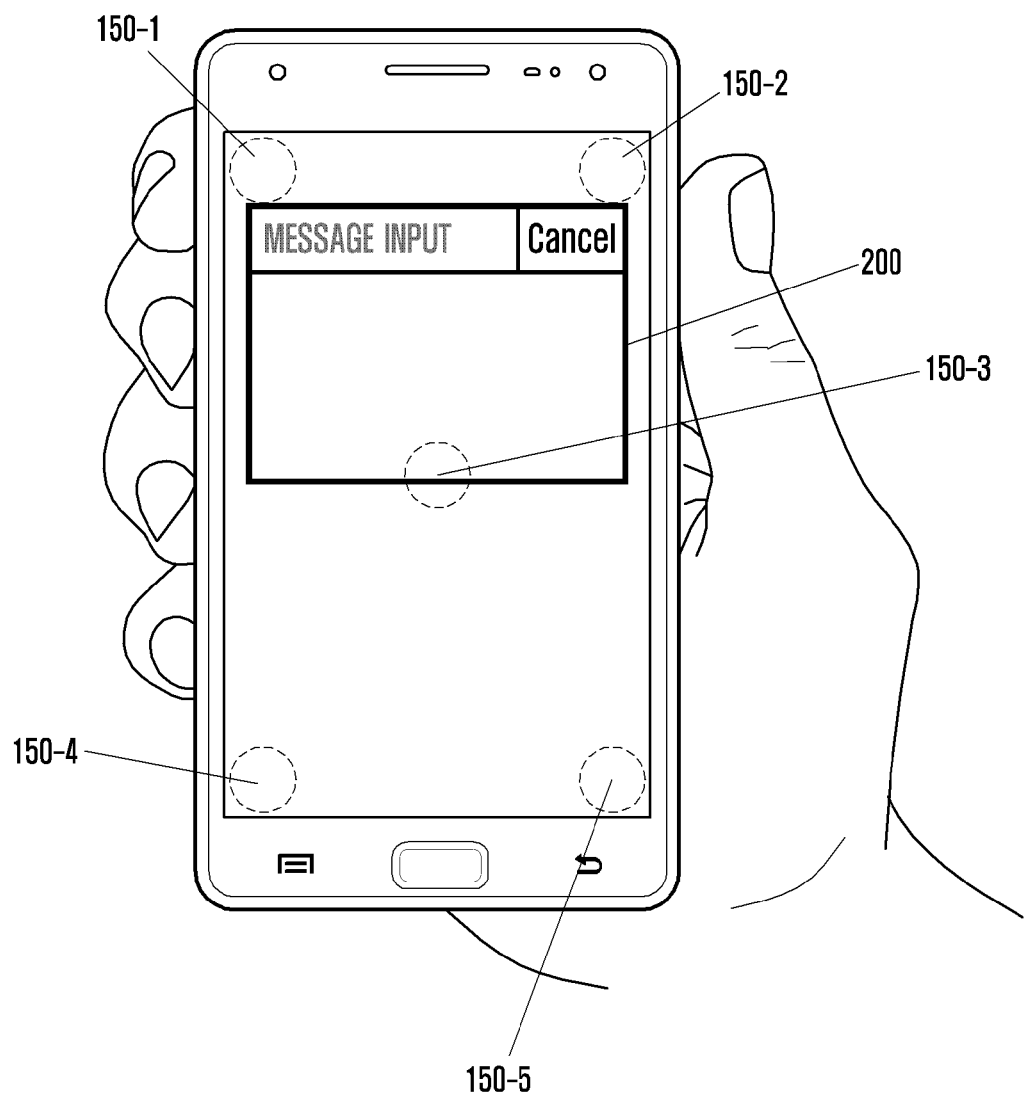
FIG. 2 illustrates an arrangement of vibration motors, such as vibration motors 150_1 to 150_5 of FIG. 1, according to an embodiment of the present disclosure.

FIG. 2 illustrates arrangement of vibration motors, such as vibration motors 150_1 to 150_5 of FIG. 1, according to an embodiment of the present disclosure.

Referring to FIG. 2, a location of information may be provided to a user by an acoustic feedback. Further, the location of the information may be provided to a user by a tactile feedback. To this end, vibration motors 150_1 to 150_5 may be arranged below a touch screen 200 as illustrated in FIG. 2.

Arrangement coordinates x and y corresponding to each of the vibration motors 150_1 to 150_5 are stored in the memory 160 in advance. The controller 170 may detect pointing coordinates (e.g. the hovering coordinates or the touch coordinates) of the pointing device through the touch panel 111 and may determine the arrangement coordinates closest to the detected pointing coordinates. Further, the controller 170 may control the vibration motor corresponding to the determined arrangement coordinates to be vibrated. For example, when the pointing area (e.g. the hovering area or the touch area) of the pointing device is adjacent to a first vibration motor 150_1, the first vibration motor 150_1 may vibrate. Accordingly, a user may visualize a location of the screen where he/she points with his/her pointing device, through a tactile feedback.

The information displayed on the screen may be guided through a voice as described above. During the voice guidance, the controller 170 may recognize a location on the screen of the information guided through the voice. Further, the controller 170 may determine coordinates of the location and determine arrangement coordinates closest to the determined location coordinates. Next, the controller 170 may control the vibration motor corresponding to the determined arrangement coordinates to be vibrated. For example, when the location of the information guided through the voice is closest to the first vibration motor 150_1, the first vibration motor 150_1 may vibrate. Accordingly, a user may visualize a location on the screen of the information currently guided through voice, in his/her brain, through a tactile feedback.

Further, the controller 170 may regulate vibration intensity of the vibration motor according to the progress direction in which the voice data is played back. Referring to FIG. 2, a text of "Message Input" and a button of "Cancel" may be displayed at an upper end of the screen. Further, the text may be converted into voice data, and the voice data may be played back. When voice data corresponding to the text of "Message Input" is played back, the controller 170 may control the first vibration motor 150_1 to vibrate strongly. When voice data corresponding to the button of "Cancel" is played back, the controller 170 may control the first vibration motor 150_1 to vibrate relatively weakly and may control a second vibration motor 150_2 to vibrate strongly. Accordingly, a user may imagine in his/her brain the progress direction of the playback through a tactile feedback.

Figure 3:
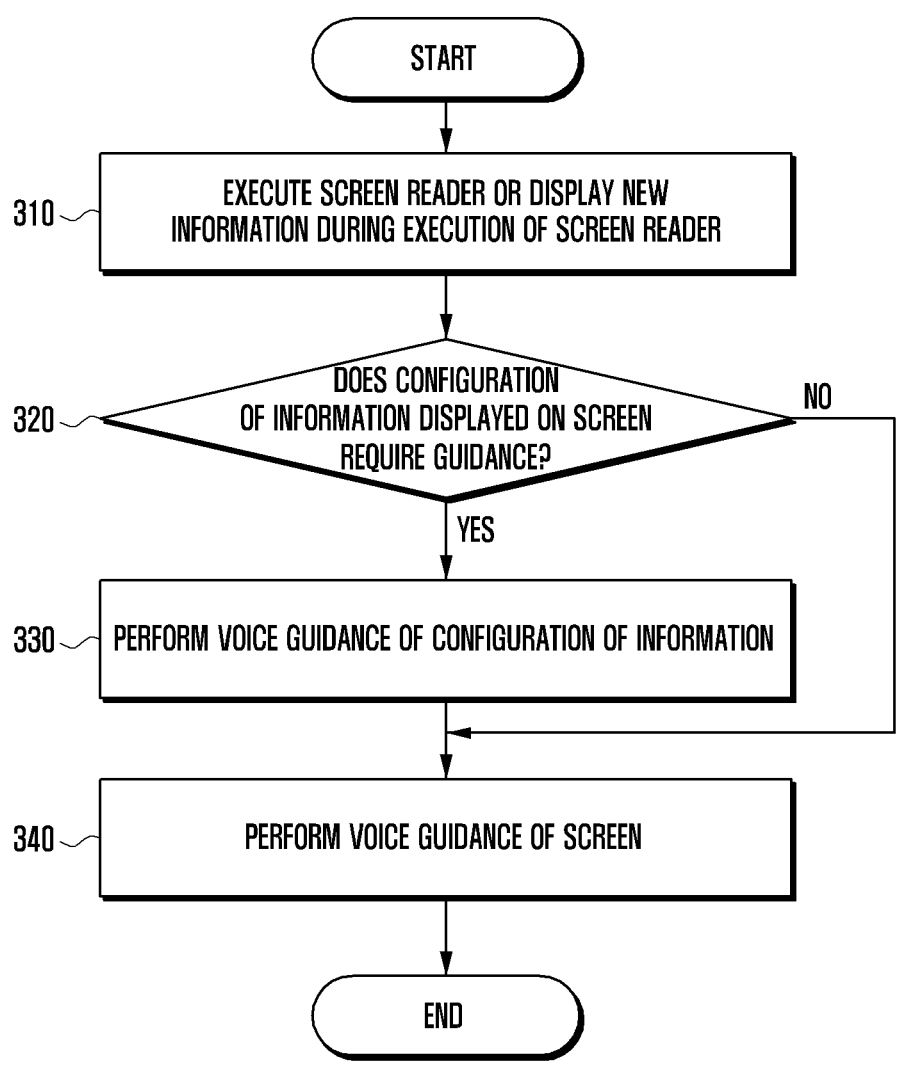
FIG. 3 is a flowchart illustrating a method of visualizing a screen according to an embodiment of the present disclosure.

FIG. 3 is a flowchart illustrating a method of visualizing a screen according to an embodiment of the present disclosure.

Referring to FIG. 3, the screen reader 162 may be executed, in operation 310. Further, new information may be displayed on a screen during the execution of the screen reader 162, in operation 310. The screen reader 162 may be automatically loaded into the main memory during a booting process of the electronic device 100 and then executed. Further, the controller 170 may execute the screen reader 162 in response to a user's input (e.g., pressing of a touch key).

In operation 320, the controller 170 may determine whether a configuration of information displayed on the screen requires guidance. For example, when the information displayed on the screen is firstly displayed after the screen reader 162 is executed, after the screen is unlocked, or after the corresponding application is executed, the controller 170 may determine that guidance the configuration of the corresponding information (e.g., a screen configuration, a location of information, a kind of information, a property of information, etc.) is required. When the information displayed on the screen has been already displayed after the screen reader 162 is executed, after the screen is unlocked, or after the corresponding application is executed, the controller 170 may determine that guidance of the configuration of the corresponding information is not required. Here, since a user is familiar with the information already displayed, the user may not need to listen to the configuration of the information.

When it is determined that guidance of the configuration of the information displayed on the screen is required, the controller 170 may control the audio processor 140 to reproduce voice data describing the configuration of the information, in operation 330. After completion of operation 330, the process proceeds to operation 340.

When it is determined that guidance of the configuration on the information displayed on the screen is not required, the controller 170 may perform voice guidance for the information displayed on the screen, in operation 340. For example, the controller 170 may control the audio processor 140 to convert the information displayed on the screen into voice data and to reproduce the voice data.

Figure 4B:
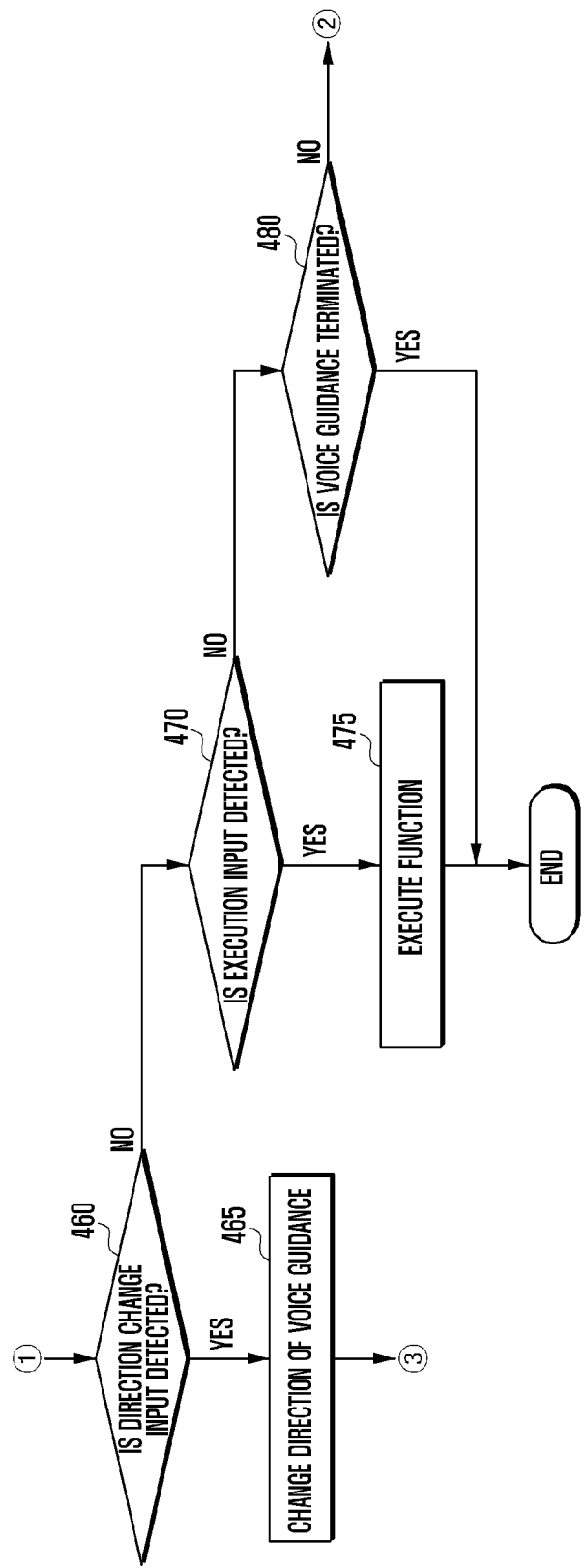
Figure 5A:
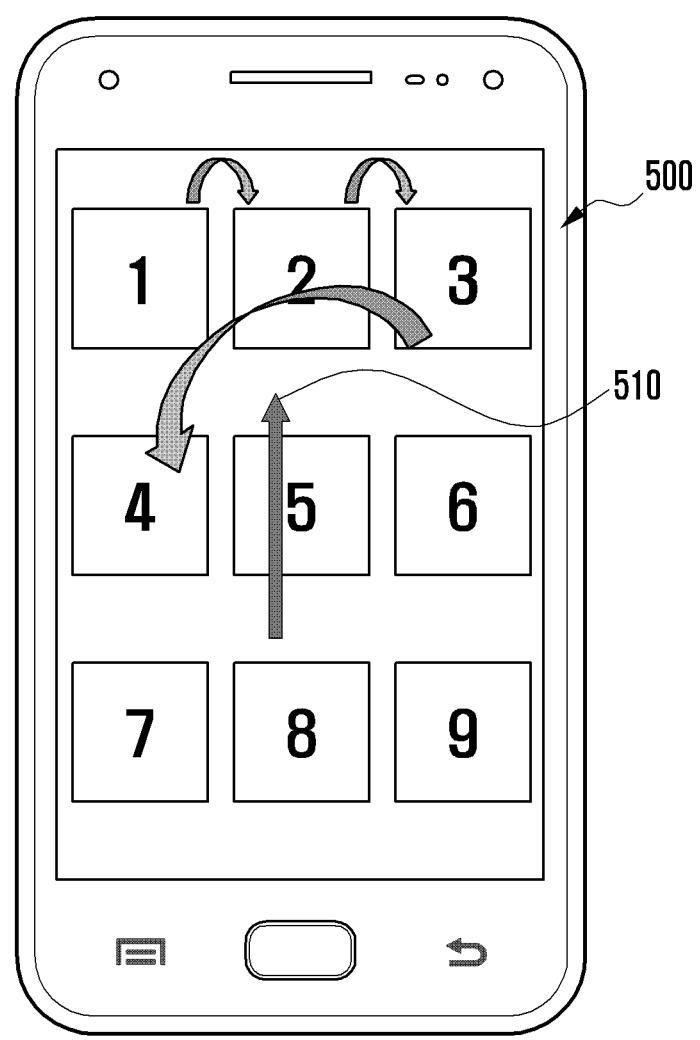
FIGS. 5A and 5B illustrate screens in which icons are arranged in a grid pattern according to an embodiment of the present disclosure.
Figure 5B:
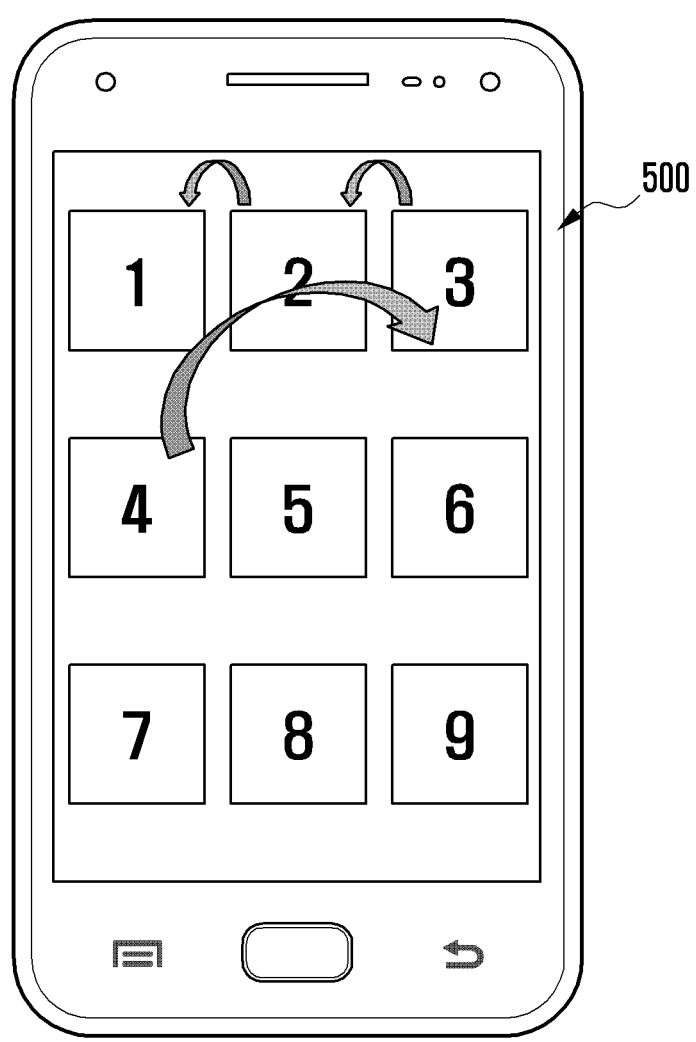

FIGS. 4A and 4B are flowcharts illustrating a method of performing voice guidance of a screen according to an embodiment of the present disclosure. FIGS. 5A and 5B illustrate screens in which icons are arranged in a grid pattern according to an embodiment of the present disclosure.

Referring to FIG. 4A, the controller 170 may perform voice guidance for the information displayed on the screen, in operation 410. That is, the controller 170 may control the audio processor 140 to convert the information displayed on the screen into voice data and to reproduce the voice data. Further, as discussed with reference to FIG. 2, the controller 170 may provide a tactile feedback corresponding to the voice data being played back, to a user. Further, the controller 170 may control the audio processor 140 to read the voice guidance setting information 161 by accessing the memory 160, determine the progress direction of the voice guidance with reference to the progress direction information in the read voice guidance setting information 161, and perform voice guidance from information corresponding to the determined direction. Further, the controller 170 may control the audio processor 140 to determine a playback speed of the voice data with reference to speed information in the read voice guidance setting information 161, and perform the voice guidance with the determined playback speed. Further, the controller 170 may control the audio processor 140 to determine an amount of the voice guidance with reference to level information in the read voice guidance setting information 161, and perform the voice guidance according to the determined amount.

The controller 170 may determine whether a pause input (e.g., a tap) is detected during the playback of the voice data, in operation 415. When the pause input is detected, the controller 170 may pause the voice guidance (i.e. the playback of the voice data), in operation 420.

After the pausing of the playback, the controller 170 may determine whether a resumption input (e.g., a tap) is detected, in operation 425. When the resumption input is detected, the controller 170 may resume the voice guidance, in operation 430.

After the resuming of the voice guidance, the controller 170 may determine whether the voice guidance is terminated, in operation 435. For example, when the playback of the voice data is completed, the process for the voice guidance may be terminated. Further, when a user's input (e.g., press of a home key) for forcedly terminating the voice guidance is detected, the process for the voice guidance may be terminated. Otherwise, the process of the voice guidance may return to operation 415.

When the pause input is not detected in operation 415, the controller 170 may determine whether a direction change input (e.g., a flick) is detected, in operation 440. When the direction change input is detected, the controller 170 may change a direction of the voice guidance, in operation 445. That is, when the direction change input is detected in a state where the voice guidance of the displayed information is performed in a predetermined order, the controller 170 may change the order and perform the voice guidance in the changed order. For example, when the voice guidance is being performed from information located at a left side of the screen to information located at a right side of the screen and from information located at an upper end of the screen to information located at a lower end of the screen, in a case where the detected direction of the flick is from a lower side to an upper side, the voice guidance may be reversely performed. This operation will be described in more detail with reference to FIGS. 5A and 5B below. First, referring to FIG. 5A, 9 icons are arranged on a touch screen 500 in a grid form, and voice guidance from a first icon 1 to a ninth icon 9 may be performed. When the voice guidance of the icons 1, 2, 3, 4 and 5 is completed and voice data describing the fifth icon 5 is being played back, a flick 510 may be generated from a lower side of the touch screen 500 to an upper side of the touch screen 500. If so, referring to FIG. 5B, the voice guidance from the fifth icon 5 to the first icon 1 may be performed. That is, the voice data for the icons 1, 2, 3 and 4 may be played back again in order of 4, 3, 2 and 1. After the direction of the playback is changed in operation 445, the process may proceed to the aforementioned operation 435.

When the direction change input is not detected in operation 440, the controller 170 may determine whether an execution input (e.g., a double tap) is detected, in operation 450. When the execution input is detected, the controller 170 may execute a function corresponding to the execution input, in operation 455. For example, the controller 170 may identify voice data being produced at a time point of detecting the execution input, identify information corresponding to the identified voice data, and execute a function corresponding to the identified information. This operation will be descried in more detail with reference to FIGS. 5A and 5B. Referring to FIGS. 5A and 5B, when a double tap (here, a location of the double tap may be anywhere. For example, the double tap may be generated on the fourth icon 4) is detected while the voice data describing the fifth icon 5 is played back, the controller 170 may control the display unit 110 to emphatically display the fifth icon 5. Further, the controller 170 may control the display unit 110 to display new information corresponding to the fifth icon 5. After the execution of such a function, the process for the voice guidance may be terminated. When the execution input is not detected in operation 450, the process may proceed to the aforementioned operation 435.

Meanwhile, when the resumption input is not detected in operation 425, the process may proceed to operation 460. Referring to FIG. 4B, the controller 170 may determine whether the direction change input (e.g., a flick) is detected, in operation 460. When the direction change input is detected, the controller 170 may change a direction of the voice guidance, in operation 465. After the direction of the voice guidance is changed in operation 465, the process may proceed to the aforementioned operation 435.

When the direction change input is not detected in operation 460, the controller 170 may determine whether an execution input (e.g., a double tap) is detected, in operation 470. When the execution input is detected, the controller 170 may execute a function corresponding to the execution input, in operation 475.

When the execution input is not detected in operation 470, the controller may determine whether to terminate the voice guidance, in operation 480. For example, when the playback of the voice data is completed, the process may be terminated. Otherwise, the process may return to operation 425.

Figure 6:
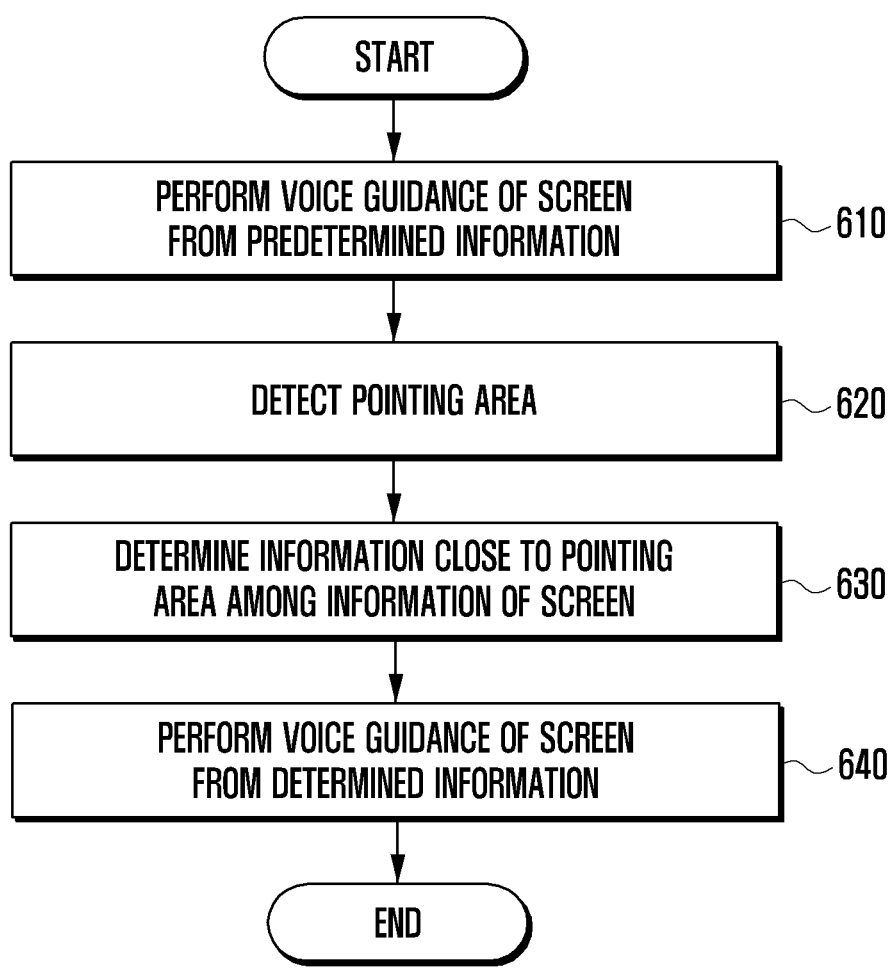
FIG. 6 is a flowchart illustrating a method of changing a location of voice guidance according to an embodiment of the present disclosure.

FIG. 6 is a flowchart illustrating a method of changing a location of voice guidance according to an embodiment of the present disclosure.

Referring to FIG. 6, the controller 170 may perform voice guidance from predetermined information among the information displayed on the screen, in operation 610. For example, referring to FIGS. 5A and 5B, the voice guidance is performed from the first icon 1 among the 9 icons.

The controller 170 may detect a pointing area (e.g., a hovering area or a touch area) through the touch panel 111 during the voice guidance, in operation 620.

When the pointing area is detected, the controller 170 may determine information close to the pointing area among the information of the screen, in operation 630.

When the information close to the pointing area is determined, the controller 170 may perform the voice guidance from the determined information, in operation 640. For example, referring to FIGS. 5A and 5B, when the fifth icon 5 is touched while the voice data describing the first icon 1 is played back, the voice guidance of the second, third and fourth icons 2, 3 and 4 may be omitted and the voice guidance from the fifth icon 5 to the ninth icon 9 may be performed.

Figure 7:
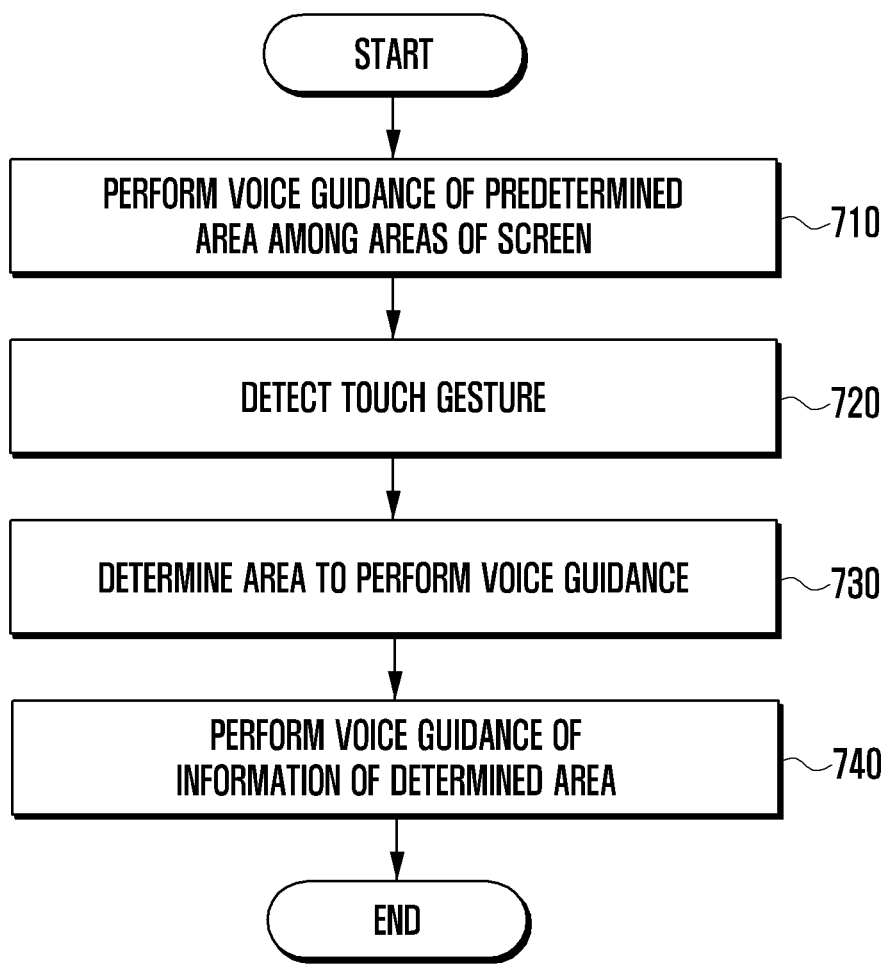
FIG. 7 is a flowchart illustrating a method of changing an area of voice guidance according to an embodiment of the present disclosure.
Figure 8:
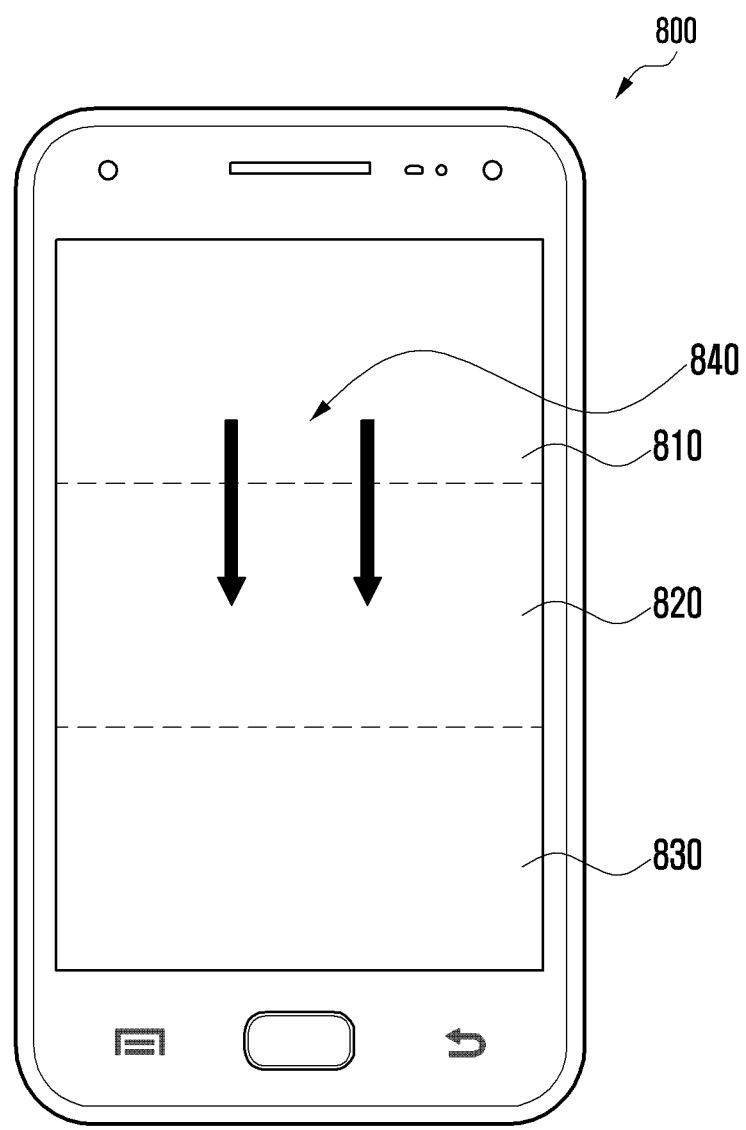
FIG. 8 illustrates a screen divided into plural areas according to an embodiment of the present disclosure.

FIG. 7 is a flowchart illustrating a method of changing an area of voice guidance according to an embodiment of the present disclosure. FIG. 8 illustrates a screen divided into plural areas according to an embodiment of the present disclosure.

Referring to FIG. 7, the controller 170 may perform voice guidance of a predetermined area among areas of the screen, in operation 710. For example, referring to FIGS. 5A and 5B, a touch screen of an electronic device 800 is divided into three areas 810, 820 and 830, and "voice data describing information included in the first area 810" may be played back first.

The controller 170 may detect a touch gesture (for example, a multi drag 840 from an upper side of the screen to a lower side of the screen) while the voice data is played back, in operation 720.

In operation 730, the controller 170 may determine an area to perform voice guidance in response to the touch gesture. For example, when the multi drag 840 is detected, the controller 170 may terminate the voice guidance of the first area 810 and determine the second area 820 as an area to perform voice guidance, in response to the detected multi drag 840. In operation 740, the controller 170 may perform the voice guidance for the information of the determined area.

Figure 9:
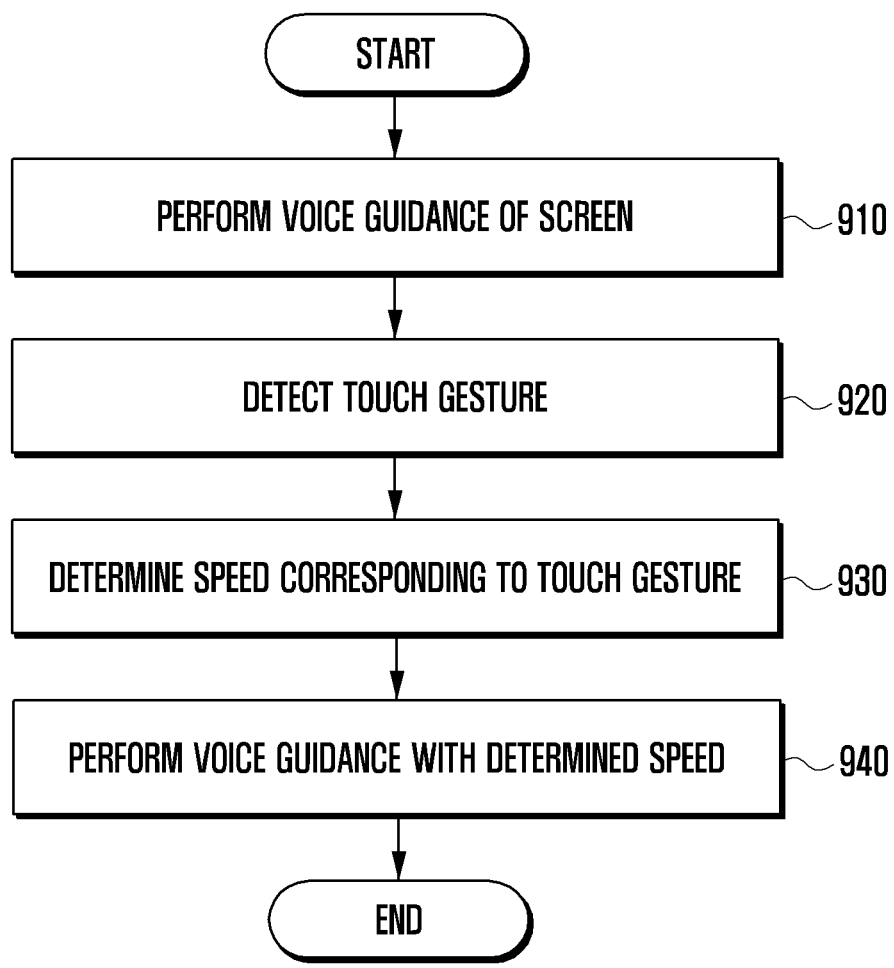
FIG. 9 is a flowchart illustrating a method of changing a speed of voice guidance according to an embodiment of the present disclosure.
Figure 10A:
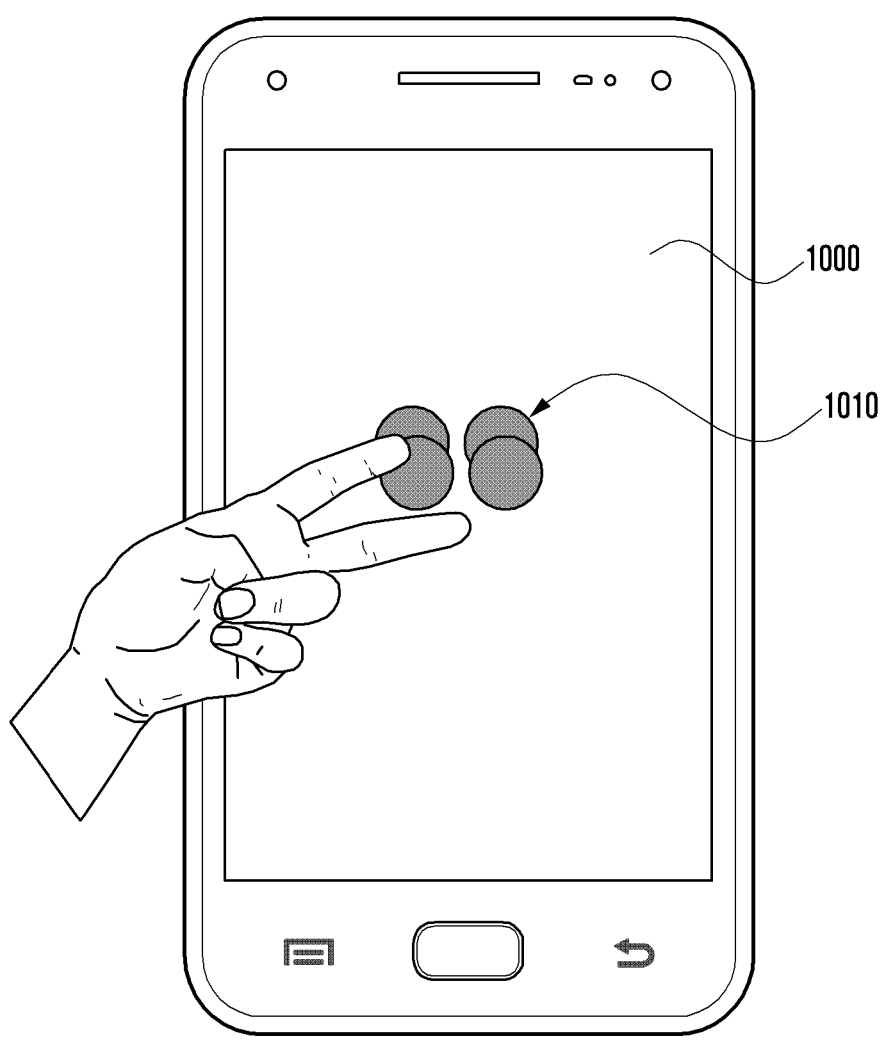
FIGS. 10A and 10B are views illustrating a method of changing a speed according to an embodiment of the present disclosure.
Figure 10B:
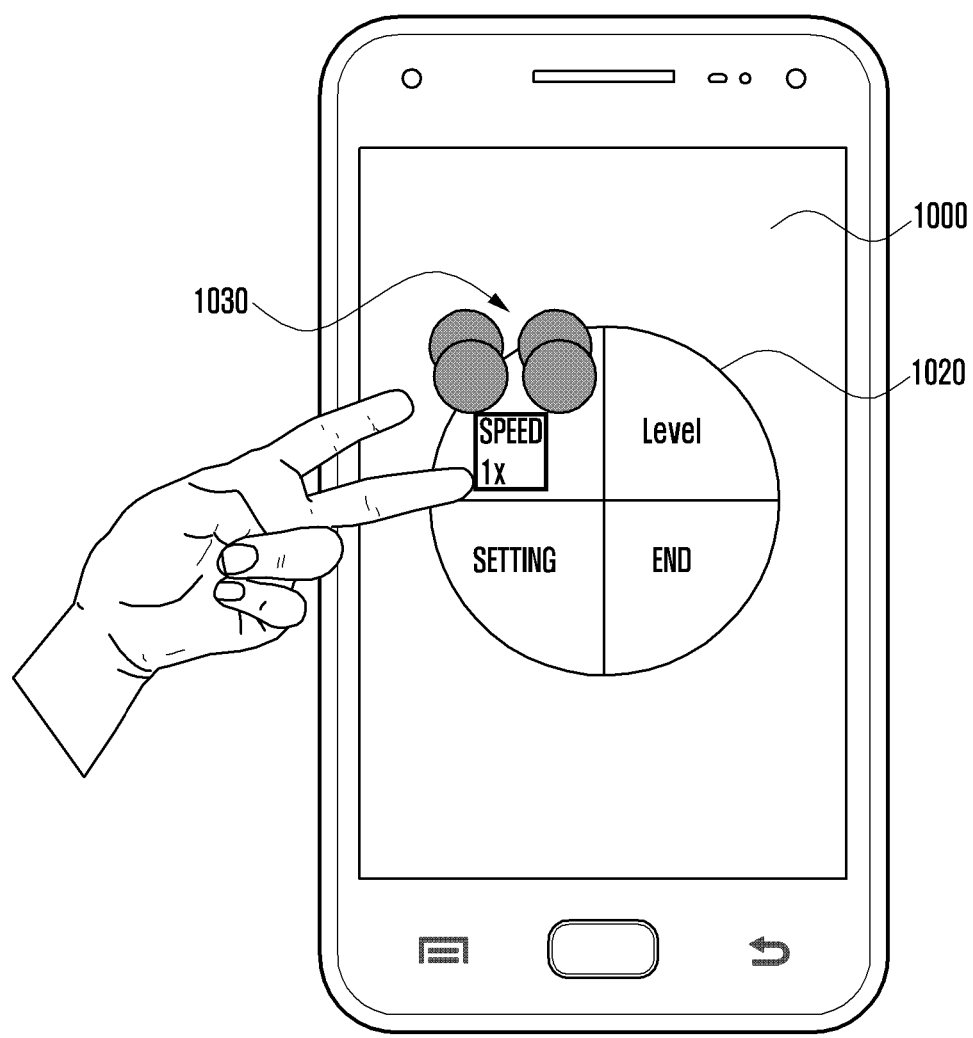

FIG. 9 is a flowchart illustrating a method of changing a speed of voice guidance according to an embodiment of the present disclosure. FIGS. 10A and 10B are views illustrating a method of changing a speed according to an embodiment of the present disclosure.

Referring to FIG. 9, the controller 170 may perform voice guidance for the information displayed on the screen, in operation 910. At this time, the controller 170 may control the audio processor 140 to read speed information by accessing the memory 160, determine a playback speed of the voice data with reference to the read speed information, and perform the voice guidance with the determined playback speed.

The controller 170 may detect a touch gesture while the voice data is played back, in operation 920.

In operation 930, the controller 170 may determine a speed of the voice guidance in response to the touch gesture. An example of the speed determination method will be described with reference to FIGS. 10A and 10B.

Referring to FIG. 10A, a user may perform a double tap 1010 on a touch screen 1000, for example by using two fingers. If so, referring to FIG. 10B, the controller 170 may control the display unit 110 to display a control panel 1020 in response to the double tap 1010. Further, the controller 170 may control the audio processor 140 to reproduce voice data describing each item of the control panel 1020.

When a user performs, for example, a tap on the touch screen 1000 in a state of displaying the control panel 1020, the controller 170 may control the audio processor 140 to reproduce voice data guiding that a "speed" item is selected, in response to the item change input. Further, the controller 170 may control the audio processor 140 to reproduce voice data guiding that the currently-set speed of the voice guidance is, for example, a 1× speed and may control the display unit 110 to emphatically display the selected "speed" item.

When a user performs a flick from a left side to a right side, the controller 170 may control the audio processor 140 to reproduce voice data guiding that a "level" item is selected, in response to the flick. Items configured in the control panel 1020 may be cyclically selected by such a user's gesture, for example, a flick from a left side to a right side (or a flick from a right side to a left side).

In a state where the speed item is selected, a user may perform a double tap 1030 on the touch screen 1000, for example by using two fingers (or one finger or three or more fingers). The controller 170 may change a speed of the voice guidance in response to such a speed change input. Whenever the speed change input is detected, the speed of the voice guidance may be cyclically selected to be, for example, a 1× speed, a 1.5× speed, a 2× speed, and then a 0.5× speed.

In operation 940, the controller 170 may perform the voice guidance with the determined speed.

Figure 11:
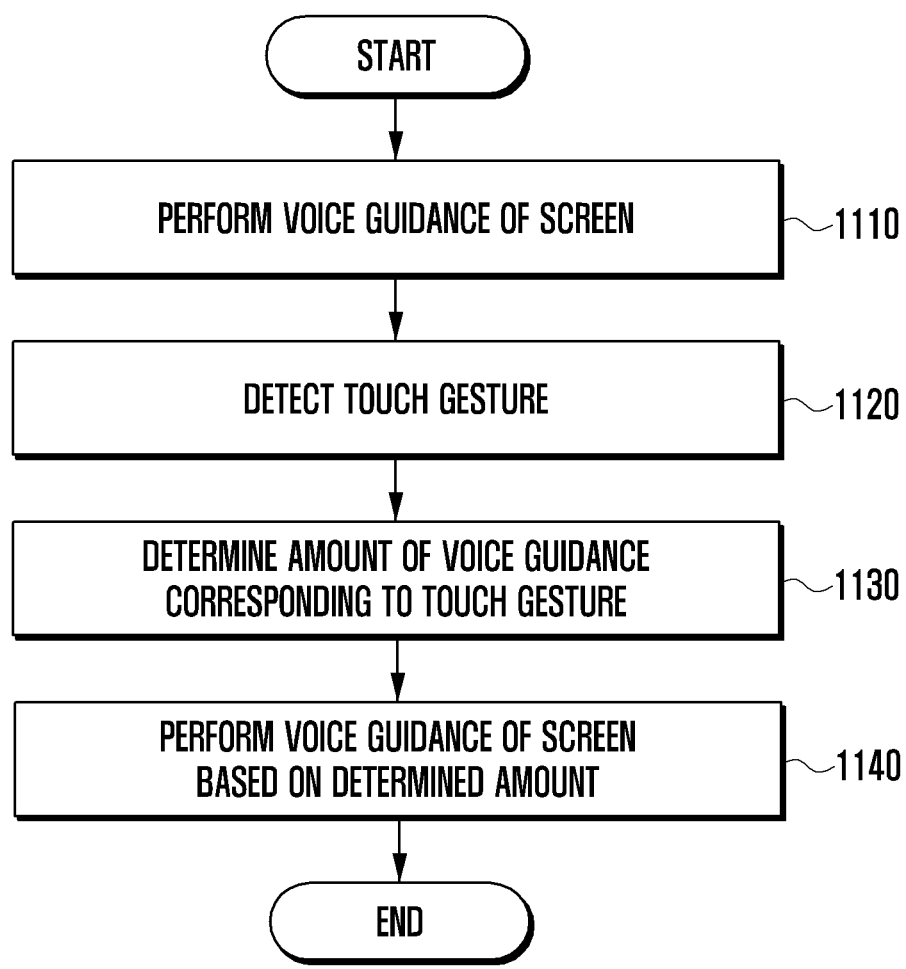
FIG. 11 is a flowchart illustrating a method of changing an amount of voice guidance according to an embodiment of the present disclosure.
Figure 12:
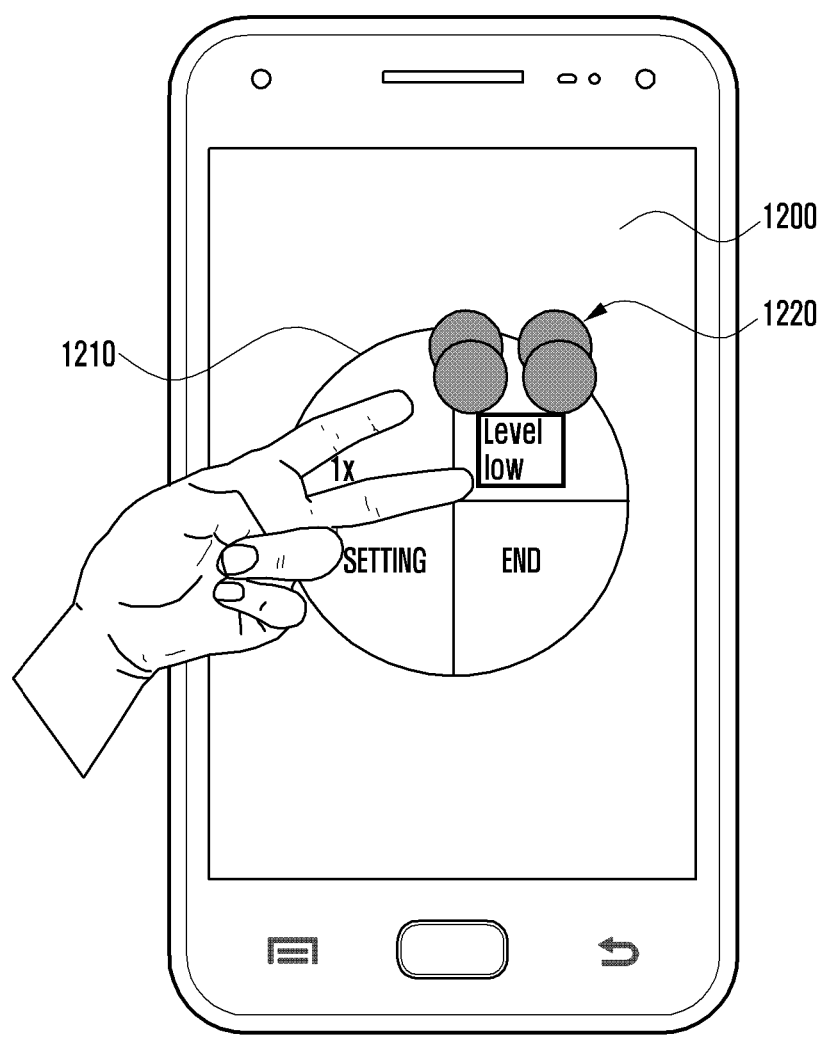
FIG. 12 is a view illustrating a method of changing an amount according to an embodiment of the present disclosure.

FIG. 11 is a flowchart illustrating a method of changing an amount of voice guidance according to an embodiment of the present disclosure. FIG. 12 is a view illustrating a method of changing an amount according to an embodiment of the present disclosure.

Referring to FIG. 11, the controller 170 may perform voice guidance for the information displayed on the screen, in operation 1110. At this time, the controller 170 may control the audio processor 140 to read level information by accessing the memory 160, determine an amount of the voice guidance with reference to the read level information, and perform the voice guidance according to the determined amount.

The controller 170 may detect a touch gesture while the voice data is played back, in operation 1120.

In operation 1130, the controller 170 may determine an amount of the voice guidance in response to the touch gesture. An example of the amount determination method will be described with reference to FIG. 12.

Referring to FIG. 12, a user may perform a double tap 1220 on a touch screen 1200 by using two fingers and may control the display unit 110 to display the control panel 1210, in response to the double tap 1220. Further, the controller 170 may control the audio processor 140 to reproduce voice data describing each item of the control panel 1210.

When a user performs a tap on the touch screen 1200 in a state of displaying the control panel 1210, a "speed" item among items of the control panel 1210 may be selected. When a user performs a flick from a left side to a right side, the controller 170 may control the audio processor 140 to reproduce voice data guiding that a "level" item is selected, in response to the flick. Further, the controller 170 may control the audio processor 140 to reproduce voice data guiding that the currently-set level is, for example, "low," and may control the display unit 110 to emphatically display the selected "level" item.

In a state where the level item is selected, a user may perform a double tap 1220 on the touch screen 1200 by using two fingers (or one finger or three or more fingers). The controller 170 may change an amount of the voice guidance in response to such an amount change input. For example, whenever the amount change input is detected, the amount of the voice guidance may be cyclically selected to be "Low", "Middle" and then "High".

In operation 1140, the controller 170 may perform the voice guidance based on the determined amount.

Figure 13:
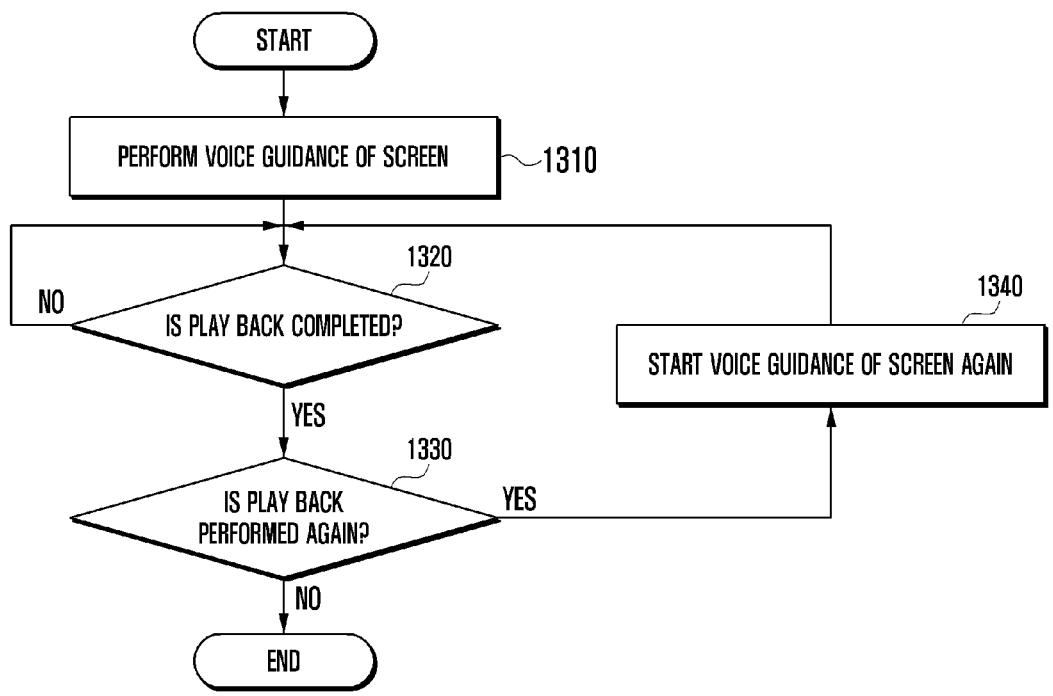
FIG. 13 is a flowchart illustrating a method of repeatedly performing voice guidance according to an embodiment of the present disclosure.

FIG. 13 is a flowchart illustrating a method of repeatedly performing voice guidance according to an embodiment of the present disclosure.

Referring to FIG. 13, the controller 170 may perform voice guidance for the information displayed on the screen, in operation 1310. At this time, the controller 170 may read the number of times of the voice guidance corresponding to the information displayed on the screen by accessing the memory 160.

In operation 1320, the controller 170 may determine whether playback of voice data describing the information displayed on the screen is completed.

When the playback is completed, the controller 170 may determine whether the voice data is needed to be played back again, in operation 1330. At this time, the controller 170 may determine whether the playback is needed again with reference to the previously-read number of times of the voice guidance.

Further, in a case where the voice data is first played back, the controller 170 may determine whether the playback is needed again according to whether the information displayed on the screen is first displayed. Here, as exemplified above, a reference time point of "first" may be at a time point after the screen reader 162 is executed, after the screen is unlocked, after an application corresponding to the information displayed on the screen is executed, etc. For example, when the displayed information is information which a user has viewed before, it is determined that the voice data is not needed to be played back again. When the displayed information is first displayed, it is determined that the voice data is needed to be played back again.

Further, in a case where the voice data is first played back, the controller 170 may determine whether the playback is needed again according to types of the information displayed on the screen. For example, when the displayed information is a home image, it is determined that the voice data is not needed to be played back again. When the displayed information is a web page of which the imagination is relatively difficult in a user's brain, it is determined that the voice data is needed to be played back again.

Further, in a case where the voice data is first played back, the controller 170 may determine whether the playback is needed again according to level information of the voice guidance setting information 161. For example, when the level information is set as "low", it is determined that the voice data is not needed to be played back again. For example, when the level information is set as "high", it is determined that the voice data is needed to be played back again.

When it is determined that the playback is needed to be performed again, the controller 170 may start the voice guidance again, in operation 1340. After starting the voice guidance again, the process may return to operation 1320. When the playback is not needed to be performed again (for example, when the corresponding voice data has been completely played back by the predetermined number of times or when the corresponding voice data is played back a second time), the process may be terminated.

Figure 14:
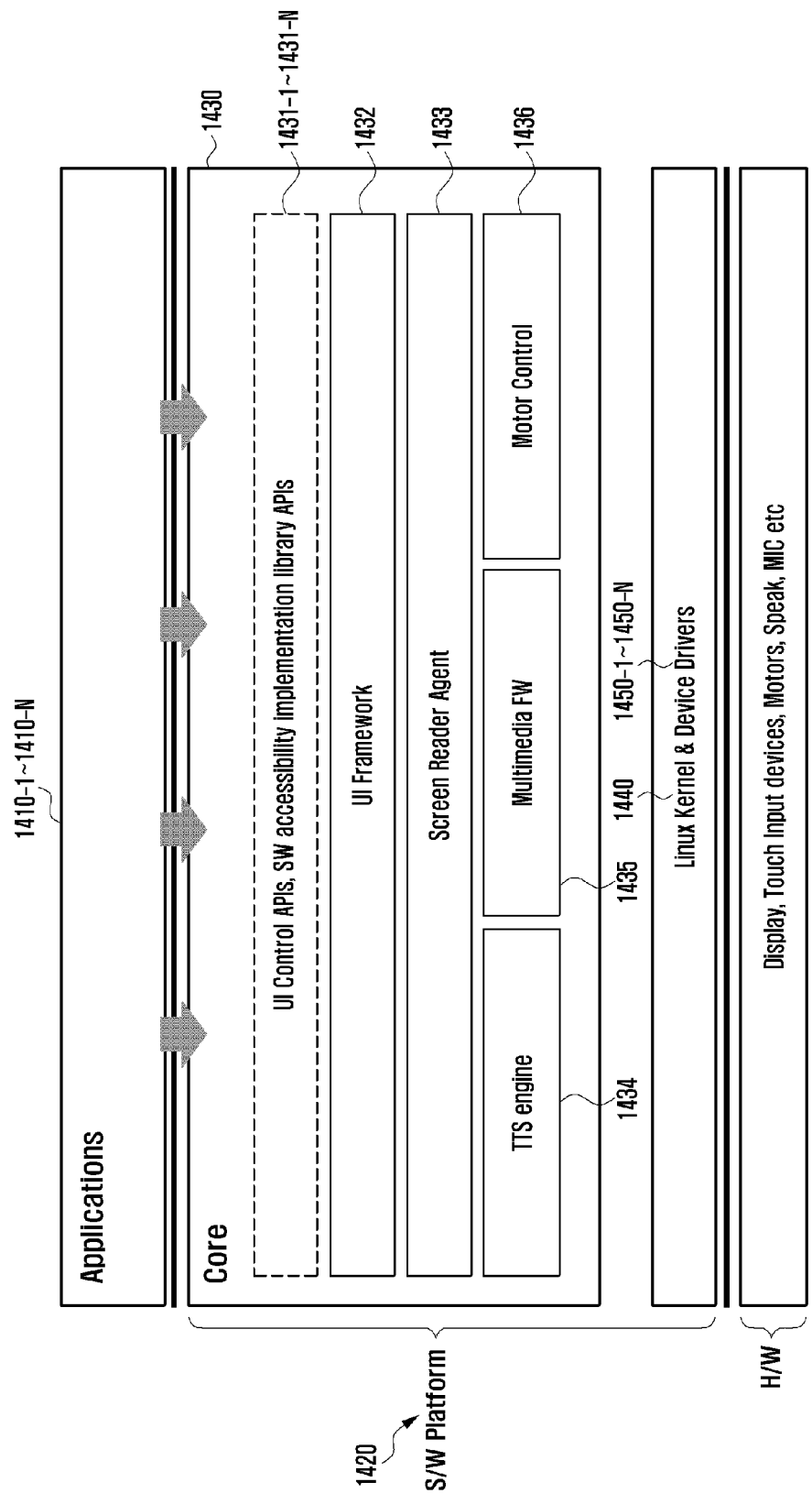
FIG. 14 is a view illustrating a software architecture according to an embodiment of the present disclosure.

FIG. 14 is a view illustrating a software architecture according to an embodiment of the present disclosure.

Configurations of a software architecture illustrated in FIG. 14 may be mounted to the electronic device 100 illustrated in FIG. 1. For example, the configurations of the software architecture may be loaded to the memory 160 and executed by at least one processor, for example, the AP 172. Referring to FIG. 14, the software architecture may include applications 1410_1 to 1410_N and a software platform 1420. The software platform 1420 may include a core 1430, a Linux kernel 1440 and device drivers 1450_1 to 1450_N. The core 1430 may include application programming interfaces 1431_1 to 1431_N, a user interface framework 1432, a screen reader agent 1433, a TTS engine 1434, a multimedia firmware 1435 and a motor control 1436.

In accordance with an embodiment of the present disclosure, the TTS engine 1434 may be a program configured to perform an operation of converting the information displayed on the screen into voice data. The multimedia firmware 1435 may be a program configured to perform an operation of reproducing the voice data. The motor control 1436 may be a program configured to perform an operation of vibrating vibration motors and an operation of regulating intensity of the vibration. The screen reader agent 1433 may be a program configured to perform an operation of controlling the TTS engine 1434, the multimedia firmware 1435 and the motor control 1436. For example, the screen reader agent 1433 may be configured to perform an operation of temporarily stopping the voice guidance in response to a user's input (e.g. a touch gesture), an operation of changing the progress direction of the voice guidance in response to a user's input, an operation of changing the speed of the voice guidance in response to a user's input, an operation of performing the voice guidance based on a touched location, an operation of changing an area of the voice guidance, an operation of changing an amount of the voice guidance, and an operation of repeatedly performing the voice guidance.

Further, the screen reader agent 1433 may be configured to perform an operation of detecting pointing coordinates (e.g., hovering coordinates or touch coordinates) of the pointing device through the touch panel 111, an operation of determining disposition coordinates closest to the detected pointing coordinates, and an operation of controlling the motor control 1436 to vibrate the vibration motor corresponding to the determined disposition coordinates.

Further, the screen reader agent 1433 may be configured to perform an operation of recognizing where information, of which the voice guidance is performed, is located on the screen, an operation of determining location coordinates of the information, an operation of determining disposition coordinates closest to the determined location coordinates, an operation of controlling the motor control 1436 to vibrate the vibration motor corresponding to the determined disposition coordinates, and an operation of controlling the motor control 1436 to regulate vibration intensity of the vibration motor according to the progress direction of the voice guidance.

Figure 15:
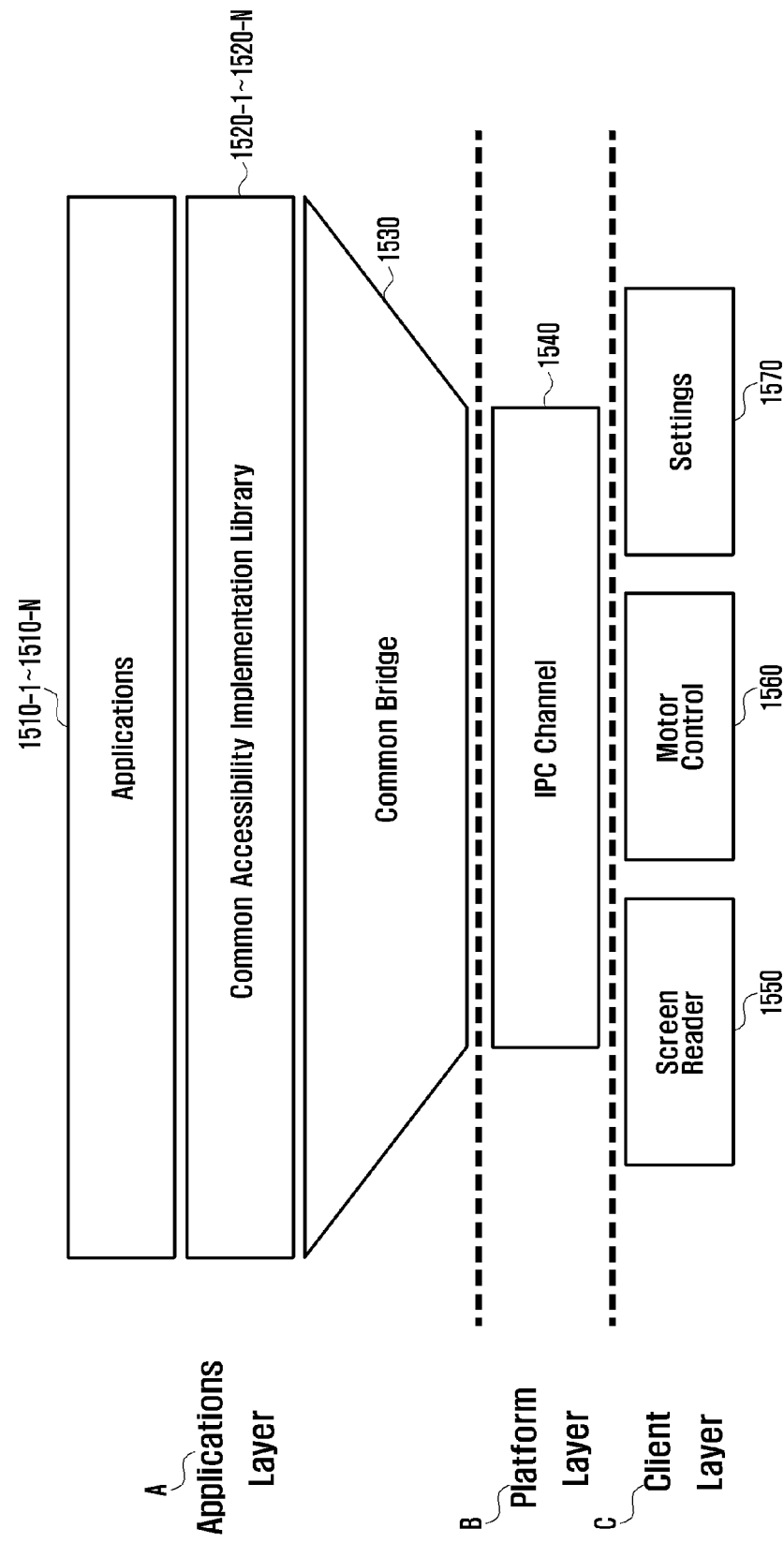
FIG. 15 is a view illustrating a hierarchical software architecture according to an embodiment of the present disclosure.

FIG. 15 is a view illustrating a hierarchical software architecture according to an embodiment of the present disclosure.

Referring to FIG. 15, programs of the present disclosure may be classified for each layer. An application layer A may include applications 1510_1 to 1510_N, application programming interfaces 1520_1 to 1520_N, and a common bridge 1530. A platform layer B may include an InterProcessor Communication (IPC) channel 1540. A client layer C may include a screen reader 1550, a motor control 1560 and setting information 1570 for an operation of the electronic device. Here, the screen reader 1550 may be a program configured to perform the same operations as the aforementioned operations of the screen reader agent 1433 or the screen reader 162. The motor control 1560 may be a program configured to perform the same operations as the aforementioned operation of the motor control 1436.

Configurations of a hierarchical software architecture illustrated in FIG. 15 may be mounted to the electronic device 100 illustrated in FIG. 1. For example, the programs classified for each layer may be loaded to the memory 160 and executed by at least on processor, for example, the AP 172.

The method according to the present disclosure as described above may be implemented by a program command which may be performed through various computers and may be stored in a computer-readable recording medium. Here, the recording medium may include a program command, a data file, a data structure, etc. Further, the program command may be especially designed and configured for the present disclosure, or may become known to those skilled in the art of the computer software to be used. Further, the recording medium may include a magnetic media such as a hard disk, a floppy disk, and a magnetic tape, an optical media such a Compact Disc Read-Only Memory (CD-ROM) and a Digital Video Disc (DVD), a magneto-optical media such as a floptical disk, and a hardware device such as a ROM, a RAM, a flash memory, etc. Further, the program command may include a high level language executed by a computer by using an interpreter as well as a machine language code made by a compiler. The hardware device may be configured to operate as one or more software modules in order to perform the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device having a touch screen, the method comprising:
displaying a plurality of contents at different locations on the touch screen;
starting, in a predetermined order, voice guidance of a user's input on the touch screen regarding information corresponding to the plurality of contents displayed on the touch screen;
detecting the user's input through the touch screen; and
if the detected user's input is an input for changing a start location of the voice guidance;
detecting a pointing area on the touch screen corresponding to the detected user's input,
determining a content closest to the pointing area among the plurality of contents,
restarting the voice guidance at the determined content in the predetermined order, and
changing, if the detected user's input is a direction change input, the order and restarting the voice guidance in the changed order.

2. The method of claim 1, further comprising:
pausing the voice guidance, when the detected user's input is a pause input; and
changing the order and restarting the voice guidance in the changed order, when the direction change input is detected after the pausing.

3. The method of claim 1, further comprising providing a tactile feedback according to information being guided through a voice.

4. The method of claim 3, wherein the providing of the tactile feedback comprises providing the tactile feedback according to a location on the touch screen of the information being guided through a voice.

5. The method of claim 1, further comprising:
determining an area corresponding to the detected user's input, among areas of the touch screen; and
performing the voice guidance in the predetermined order from information corresponding to content of the detected area.

6. The method of claim 1, further comprising when the detected user's input is a speed change input, changing a speed of the voice guidance according to the speed change input.

7. The method of claim 1, further comprising, when the detected user's input is an amount change input, changing an amount of the voice guidance according to the amount change input.

8. The method of claim 1, further comprising:
determining, when the voice guidance for the information corresponding to the plurality of contents displayed on the touch screen is completed, whether the voice guidance is needed to be restarted again; and
restarting, when it is determined that the voice guidance is needed to be performed again, the voice guidance for the information corresponding to the plurality of contents displayed on the touch screen again.

9. The method of claim 8, wherein the determining of whether the voice guidance is needed to be restarted again comprises restarting the determination with reference to at least one of the predetermined number of times, whether the information displayed on the touch screen is firstly-displayed information, types of the information displayed on the touch screen, and predetermined level information relating to an amount of the voice guidance.

10. An electronic device, comprising:
a touch screen configured to display a plurality of contents at different locations on the touch screen;

a memory configured to store the plurality of contents information to be displayed on the touch screen and information corresponding to the plurality of contents;

an audio processor and a speaker configured to start voice guidance of information corresponding to the plurality of contents displayed on the touch screen;

a screen reader configured to:
- start, in a predetermined order, the voice guidance of a user's input on the touch screen regarding the information displayed on the touch screen,
- detect the user's input through the touch screen, if the detected user's input is an input for changing a start location of the voice guidance, to detect a pointing area on the touch screen corresponding to the detected user's input,
- determine a content closest to the pointing area among the plurality of contents,
- restart the voice guidance at the determined content in the predetermined order, and
- if the detected user's input is a direction change input, to change the order and restart the voice guidance in the changed order; and at least one processor configured to execute the screen reader.

11. The electronic device of claim 10, wherein the screen reader is further configured to:
- perform pausing the voice guidance, when the detected user's input is a pause input, and
- change the order and restart the voice guidance in the changed order, when the direction change input is detected after the pausing.

12. The electronic device of claim 10, wherein the screen reader is further configured to provide a tactile feedback according to information being guided through voice.

13. The electronic device of claim 12, wherein the providing of the tactile feedback comprises providing the tactile feedback according to a location on the touch screen of the information being guided through a voice.

14. The electronic device of claim 13, further comprising a plurality of vibration motors in order to provide the tactile feedback.

15. The electronic device of claim 10, wherein the screen reader is further configured to:
- determine an area corresponding to the detected user's input, among areas of the touch screen, and
- restart the voice guidance in the predetermined order from information of the detected area.

16. The electronic device of claim 10, wherein the screen reader is further configured to change a speed of the voice guidance according to a speed change input when the detected user's input is the speed change input.

17. The electronic device of claim 10, wherein the screen reader is further configured to change an amount of the voice guidance according to an amount change input, when the detected user's input is the amount change input.

18. The electronic device of claim 10, wherein the screen reader is further configured to:
- determine, when the voice guidance for the information corresponding to the plurality of contents displayed on the touch screen is completed, whether the voice guidance is needed to be restarted, and
- restart, when it is determined that the voice guidance is needed to be restarted again, the voice guidance for the information corresponding to the plurality of contents displayed on the touch screen again.

* * * * *